(12) United States Patent
Caspall

(10) Patent No.: US 12,529,775 B2
(45) Date of Patent: Jan. 20, 2026

(54) UNIVERSAL SCANNING SYSTEM FOR SONAR

(71) Applicant: Navico, Inc., Tulsa, OK (US)

(72) Inventor: Jayme J. Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 228 days.

(21) Appl. No.: 18/532,139

(22) Filed: Dec. 7, 2023

(65) Prior Publication Data

US 2025/0189646 A1    Jun. 12, 2025

(51) Int. Cl.
| | | |
|---|---|---|
| G01S 7/521 | (2006.01) | |
| G01S 7/56 | (2006.01) | |
| G01S 15/89 | (2006.01) | |

(52) U.S. Cl.
CPC ............ G01S 7/521 (2013.01); G01S 7/56 (2013.01); G01S 15/89 (2013.01)

(58) Field of Classification Search
CPC . G01S 7/56; G01S 15/89; G01S 7/521; B60D 1/06; B60D 1/248
See application file for complete search history.

(56) References Cited

U.S. PATENT DOCUMENTS

| | | | |
|---|---|---|---|
| 2,877,733 A | 3/1959 | Harris | |
| 3,598,947 A | 8/1971 | Osborn | |
| 3,807,345 A | 4/1974 | Peterson | |
| 4,982,924 A * | 1/1991 | Havins | G10K 11/006 248/295.11 |

(Continued)

FOREIGN PATENT DOCUMENTS

| | | |
|---|---|---|
| CA | 2887031 A1 | 10/2015 |
| CA | 2984303 C | 8/2022 |

(Continued)

OTHER PUBLICATIONS

"Minn Kota Riptide ST Foot Pedal Accessory User Manual;" retrieved Dec. 7, 2017 from file:///C:/Users/PForbes/Downloads/2377123rc_RT_ST_Foot_Pedal_Manual.pdf.; 4 pages.

(Continued)

Primary Examiner — Daniel L Murphy
Assistant Examiner — Amie M Ndure
(74) Attorney, Agent, or Firm — Nelson Mullins Riley & Scarborough LLP

(57) ABSTRACT

A method for forming a sonar image is provided comprising receiving first sonar data from a sonar transducer assembly when it is oriented in a first orientation, receiving first orientation data, and causing an actuator to generate movement of the sonar transducer assembly so it moves from the first orientation to a second orientation. The method includes receiving second sonar data from the sonar transducer assembly when it is oriented in the second orientation, receiving second orientation data, and creating a sonar image using the first sonar data, the second sonar data, the first orientation data, and the second orientation data. The sonar image includes first and second image portions including image data representative of the first and second sonar data. The first image portion is positioned relative to the second image portion to portray a real-world differential position of the first sonar data relative to the second sonar data.

20 Claims, 31 Drawing Sheets

(56) References Cited

U.S. PATENT DOCUMENTS

| | | | |
|---|---|---|---|
| 5,142,497 A * | 8/1992 | Warrow | G10K 11/006 367/12 |
| 5,293,351 A | 3/1994 | Noponen | |
| 5,420,828 A | 5/1995 | Geiger | |
| 5,526,765 A * | 6/1996 | Ahearn | B63B 49/00 114/221 R |
| 5,892,338 A | 4/1999 | Moore et al. | |
| 6,054,831 A | 4/2000 | Moore et al. | |
| 6,181,644 B1 | 1/2001 | Gallagher | |
| 6,325,684 B1 | 12/2001 | Knight | |
| 6,447,347 B1 | 9/2002 | Steinhauser | |
| 6,504,794 B2 | 1/2003 | Haase et al. | |
| 6,507,164 B1 | 1/2003 | Healey et al. | |
| 6,524,144 B2 | 2/2003 | Pasley | |
| 6,661,742 B2 | 12/2003 | Hansen | |
| 6,678,589 B2 | 1/2004 | Robertson et al. | |
| 6,868,360 B1 | 3/2005 | Olstad et al. | |
| 6,870,794 B2 | 3/2005 | Healey | |
| 6,899,574 B1 | 5/2005 | Kalis et al. | |
| 6,902,446 B1 | 6/2005 | Healey | |
| 6,909,946 B1 | 6/2005 | Kabel et al. | |
| 6,919,704 B1 | 7/2005 | Healey | |
| 7,004,804 B2 | 2/2006 | Bernloehr et al. | |
| 7,190,636 B1 | 3/2007 | Depaola | |
| 7,195,526 B2 | 3/2007 | Bernloehr et al. | |
| 7,268,703 B1 | 9/2007 | Kabel et al. | |
| 7,303,595 B1 | 12/2007 | Janitz | |
| 7,371,218 B2 | 5/2008 | Walston et al. | |
| 7,430,461 B1 | 9/2008 | Michaels | |
| 7,452,251 B2 | 11/2008 | Boebel | |
| 7,538,511 B2 | 5/2009 | Samek | |
| D594,034 S | 6/2009 | Bernloehr et al. | |
| 7,542,376 B1 | 6/2009 | Thompson et al. | |
| 7,633,431 B1 | 12/2009 | Wey | |
| 7,722,417 B2 | 5/2010 | Bernloehr et al. | |
| 7,889,600 B2 | 2/2011 | Thompson et al. | |
| 8,106,617 B1 | 1/2012 | Holley | |
| 8,195,084 B2 | 6/2012 | Xiao | |
| 8,221,175 B2 | 7/2012 | Mynster | |
| 8,305,844 B2 | 11/2012 | DePasqua | |
| 8,645,012 B2 | 2/2014 | Salmon et al. | |
| 8,761,976 B2 | 6/2014 | Salmon et al. | |
| 8,814,129 B2 | 8/2014 | Todd et al. | |
| 8,879,359 B2 | 11/2014 | DePasqua | |
| 8,888,065 B2 | 11/2014 | Logan | |
| 8,896,480 B1 | 11/2014 | Wilson et al. | |
| 8,991,280 B2 | 3/2015 | Wireman | |
| 9,127,707 B1 | 9/2015 | Huntley | |
| 9,132,900 B2 | 9/2015 | Salmon et al. | |
| 9,135,731 B2 | 9/2015 | Lauenstein et al. | |
| 9,160,210 B2 | 10/2015 | Perry | |
| 9,162,743 B1 | 10/2015 | Grace et al. | |
| 9,201,142 B2 | 12/2015 | Antao | |
| 9,278,745 B2 | 3/2016 | Kooi, Jr. et al. | |
| 9,290,256 B1 | 3/2016 | Wireman et al. | |
| 9,296,455 B2 | 3/2016 | Bernloehr et al. | |
| 9,322,915 B2 | 4/2016 | Betts et al. | |
| 9,354,311 B2 | 5/2016 | Chen et al. | |
| 9,394,040 B2 | 7/2016 | Grace et al. | |
| 9,459,350 B2 | 10/2016 | Betts et al. | |
| 9,505,477 B2 | 11/2016 | Grace et al. | |
| 9,507,562 B2 | 11/2016 | Bailey | |
| 9,594,375 B2 | 3/2017 | Jopling | |
| 9,596,839 B2 | 3/2017 | Bailey | |
| 9,676,462 B2 | 6/2017 | Bernloehr et al. | |
| 9,746,874 B2 | 8/2017 | Johnson et al. | |
| 9,758,222 B2 | 9/2017 | Grace et al. | |
| 9,784,825 B2 | 10/2017 | Brown et al. | |
| 9,812,118 B2 | 11/2017 | Matson et al. | |
| 9,836,129 B2 | 12/2017 | Clark | |
| 9,947,309 B2 | 4/2018 | Stokes et al. | |
| 10,012,731 B2 | 7/2018 | Pelin et al. | |
| 10,025,312 B2 | 7/2018 | Langford-Wood | |
| 10,061,025 B2 | 8/2018 | Kirmani | |
| 10,107,908 B2 | 10/2018 | Betts et al. | |
| 10,114,119 B2 | 10/2018 | Horner et al. | |
| 10,114,470 B2 | 10/2018 | Clark | |
| 10,203,403 B2 | 2/2019 | Fabrizio et al. | |
| 10,241,200 B2 | 3/2019 | Sayer et al. | |
| 10,247,823 B2 | 4/2019 | Brown et al. | |
| 10,281,576 B2 | 5/2019 | Depasqua | |
| 10,310,062 B2 | 6/2019 | Coleman et al. | |
| 10,311,715 B2 | 6/2019 | Jopling | |
| 10,324,175 B2 | 6/2019 | Laster | |
| 10,325,582 B2 | 6/2019 | Antao et al. | |
| 10,451,732 B2 | 10/2019 | Laster | |
| 10,460,484 B2 | 10/2019 | Hovland et al. | |
| 10,514,451 B2 | 12/2019 | Brown et al. | |
| 10,545,226 B2 | 1/2020 | Wigh et al. | |
| 10,545,235 B2 | 1/2020 | Pelin et al. | |
| 10,684,368 B2 | 6/2020 | Pelin et al. | |
| 10,723,428 B1 | 7/2020 | Vicari et al. | |
| 10,890,660 B2 | 1/2021 | Wigh et al. | |
| 11,059,556 B2 * | 7/2021 | Ahlgren | B63H 20/32 |
| 11,061,136 B2 | 7/2021 | Abbas et al. | |
| 11,209,543 B2 * | 12/2021 | Clark | G10K 11/008 |
| 11,217,216 B2 | 1/2022 | Vance | |
| 11,370,516 B2 | 6/2022 | Ridl | |
| 11,525,907 B2 | 12/2022 | Wigh et al. | |
| 11,536,820 B2 | 12/2022 | Wigh et al. | |
| 11,703,866 B2 | 7/2023 | Snyder et al. | |
| 11,796,661 B2 | 10/2023 | Caspall | |
| 2003/0191562 A1 | 10/2003 | Robertson et al. | |
| 2003/0203684 A1 | 10/2003 | Healey | |
| 2003/0214483 A1 | 11/2003 | Hammer et al. | |
| 2003/0214880 A1 | 11/2003 | Rowe | |
| 2005/0255761 A1 | 11/2005 | Bernloehr et al. | |
| 2006/0116031 A1 | 6/2006 | Bernloehr et al. | |
| 2009/0037040 A1 | 2/2009 | Salmon et al. | |
| 2009/0227158 A1 | 9/2009 | Bernloehr et al. | |
| 2010/0103775 A1 * | 4/2010 | Betts | G01S 7/521 367/173 |
| 2012/0014220 A1 | 1/2012 | DePasqua | |
| 2012/0015566 A1 | 1/2012 | Salmon | |
| 2012/0060733 A1 | 3/2012 | Maki et al. | |
| 2012/0204467 A1 | 8/2012 | Palmer et al. | |
| 2012/0232719 A1 | 9/2012 | Salmon et al. | |
| 2012/0299764 A1 | 11/2012 | Haneda et al. | |
| 2013/0044569 A1 | 2/2013 | DePasqua | |
| 2013/0215719 A1 | 8/2013 | Betts et al. | |
| 2014/0203162 A1 | 7/2014 | Logan | |
| 2014/0249698 A1 | 9/2014 | Salmon et al. | |
| 2014/0269164 A1 | 9/2014 | Betts et al. | |
| 2014/0277851 A1 | 9/2014 | Grace et al. | |
| 2014/0336854 A1 | 11/2014 | Salmon et al. | |
| 2015/0016130 A1 | 1/2015 | Davis et al. | |
| 2015/0063059 A1 | 3/2015 | DePasqua | |
| 2015/0063060 A1 | 3/2015 | DePasqua | |
| 2015/0151824 A1 | 6/2015 | Wireman | |
| 2015/0346729 A1 | 12/2015 | Grace et al. | |
| 2016/0016651 A1 | 1/2016 | Anderson et al. | |
| 2016/0253150 A1 | 9/2016 | Williams et al. | |
| 2017/0038460 A1 | 2/2017 | Clark | |
| 2017/0285167 A1 | 10/2017 | Proctor et al. | |
| 2017/0371039 A1 | 12/2017 | Clark et al. | |
| 2018/0244361 A1 | 8/2018 | Laster | |
| 2018/0288990 A1 | 10/2018 | Laster et al. | |
| 2018/0329056 A1 | 11/2018 | Smith et al. | |
| 2018/0365246 A1 | 12/2018 | Laster et al. | |
| 2019/0064348 A1 * | 2/2019 | Clark | G01S 15/96 |
| 2019/0072951 A1 | 3/2019 | Clark et al. | |
| 2019/0176952 A1 | 6/2019 | Clark et al. | |
| 2019/0176953 A1 | 6/2019 | Clark et al. | |
| 2019/0219692 A1 | 7/2019 | Depasqua | |
| 2019/0265354 A1 * | 8/2019 | Antao | G01S 15/8993 |
| 2019/0331779 A1 | 10/2019 | Sandretto | |
| 2020/0070943 A1 | 3/2020 | Clark et al. | |
| 2020/0072953 A1 | 3/2020 | Wigh et al. | |
| 2020/0103512 A1 | 4/2020 | Brown et al. | |
| 2020/0103524 A1 * | 4/2020 | Caspall | G01S 15/8902 |
| 2020/0256967 A1 | 8/2020 | Wigh et al. | |
| 2020/0271782 A1 | 8/2020 | Rolt et al. | |
| 2020/0401143 A1 | 12/2020 | Johnson et al. | |
| 2021/0001967 A1 * | 1/2021 | Ahlgren | B63H 20/10 |

(56) References Cited

U.S. PATENT DOCUMENTS

| | | | |
|---|---|---|---|
| 2021/0056944 | A1 | 2/2021 | Vance |
| 2021/0141086 | A1 | 5/2021 | Sloss et al. |
| 2021/0165068 | A1* | 6/2021 | Clark .................... G01S 7/521 |
| 2021/0255627 | A1 | 8/2021 | Snyder et al. |
| 2021/0278514 | A1 | 9/2021 | Hughes |
| 2022/0018958 | A1 | 1/2022 | Wagner |
| 2022/0108677 | A1 | 4/2022 | Vance |
| 2022/0120882 | A1 | 4/2022 | Coleman et al. |
| 2022/0373662 | A1 | 11/2022 | Crawford et al. |
| 2022/0373663 | A1* | 11/2022 | Caspall ................... B63B 45/08 |
| 2022/0373676 | A1* | 11/2022 | Pendergraft ............ G01S 15/42 |
| 2022/0381891 | A1 | 12/2022 | Roland et al. |

FOREIGN PATENT DOCUMENTS

| | | |
|---|---|---|
| CN | 109 471 116 A | 3/2019 |
| EP | 2 602 639 A1 | 6/2013 |
| EP | 1 891 461 B1 | 5/2014 |
| EP | 3170021 A1 | 5/2017 |
| EP | 3315993 A1 | 5/2018 |
| EP | 3171200 B1 | 6/2021 |
| GB | 2 421 312 A | 6/2006 |
| KR | 2018096482 A | 8/2018 |
| WO | WO 95/28682 A1 | 10/1995 |
| WO | WO 2013/126761 A1 | 8/2013 |
| WO | WO 2014/144471 A1 | 9/2014 |
| WO | WO 2016/010619 A1 | 1/2016 |
| WO | WO 2019/129068 A1 | 7/2019 |
| WO | WO 2020/114107 A1 | 6/2020 |

OTHER PUBLICATIONS

"Bass Resource the Ultimate Bass Fishing Resource Guide: Bass Fishing Forums Trolling Motor Foot Pedal—Do You Mount to Deck ?;" retrieved Dec. 8, 2017 from https://www.bassresource.com/bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OVISH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al.; "The Click Effect;" New York Times VR; retrieved Feb. 13, 2020 from https://www.with.in/watch/CnVHWFg.

Porathe; "3-D Nautical Charts and Safe Navigation;" Department of Innovation, Design and Product Development; Doctoral Dissertation No. 27, Mälardalen University; Jan. 1, 2006; pp. 1-307 (XP055119720).

"LiveSweep (Wired or Wireless Pedal) Mounting Hardware Included;" *Cornfield Crappie Gear*; retrieved Jul. 19, 2021 from https://www.cornfieldcrappiegear.com/product-page/livesweep-wired-pedal-mounting-hardware-included.

"Google Glass;" *Wikipedia*, retrieved Apr. 18, 2013 from http://en.wikipedia.org/wiki/Google_Glass.

"Navico set to GoFree"; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

"Motor Guide Xi5 Wireless Foot Pedal;" retrieved Dec. 7, 2017 from http://www.motorguide.com/store/accessory/xi5-wireless-foot-pedal0.

"Magic Leap Quick Start Guide;" 2018; retrieved Feb. 13, 2020 from https://assets.ctfassets.net/b173eiperqoo/4H4PJgU9C0GySyie4QeuWE/c7ef230a10147e86173dd9250ce5b064/180606_QSG_277x190mm_PANTONE_v1.pdf.

*Cornfield Crappie Gear*; retrieved Jul. 19, 2021 from https://www.cornfieldcrappiegear.com/.

"The LiveScanner with True Scan Technology;" retrieved Mar. 24, 2022 from https://www.thelivescanner.com/.

Sealock; "Rite-Hite Turret Livescope Mount Review;" Dec. 17, 2020; retrieved Mar. 24, 2022 from https://www.wired2fish.com/electronics/rite-hite-turret-livescope-mount-review/.

*LSMount*; retrieved Mar. 24, 2022 from https://lsmounts.com.

* cited by examiner

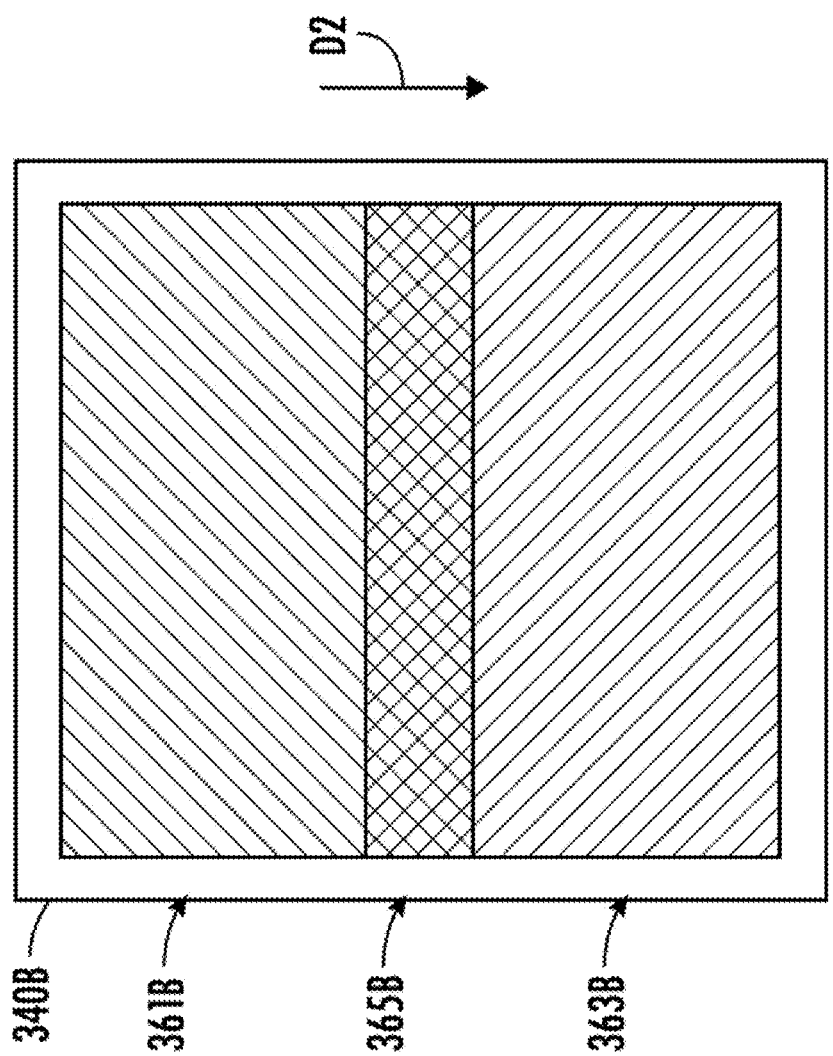

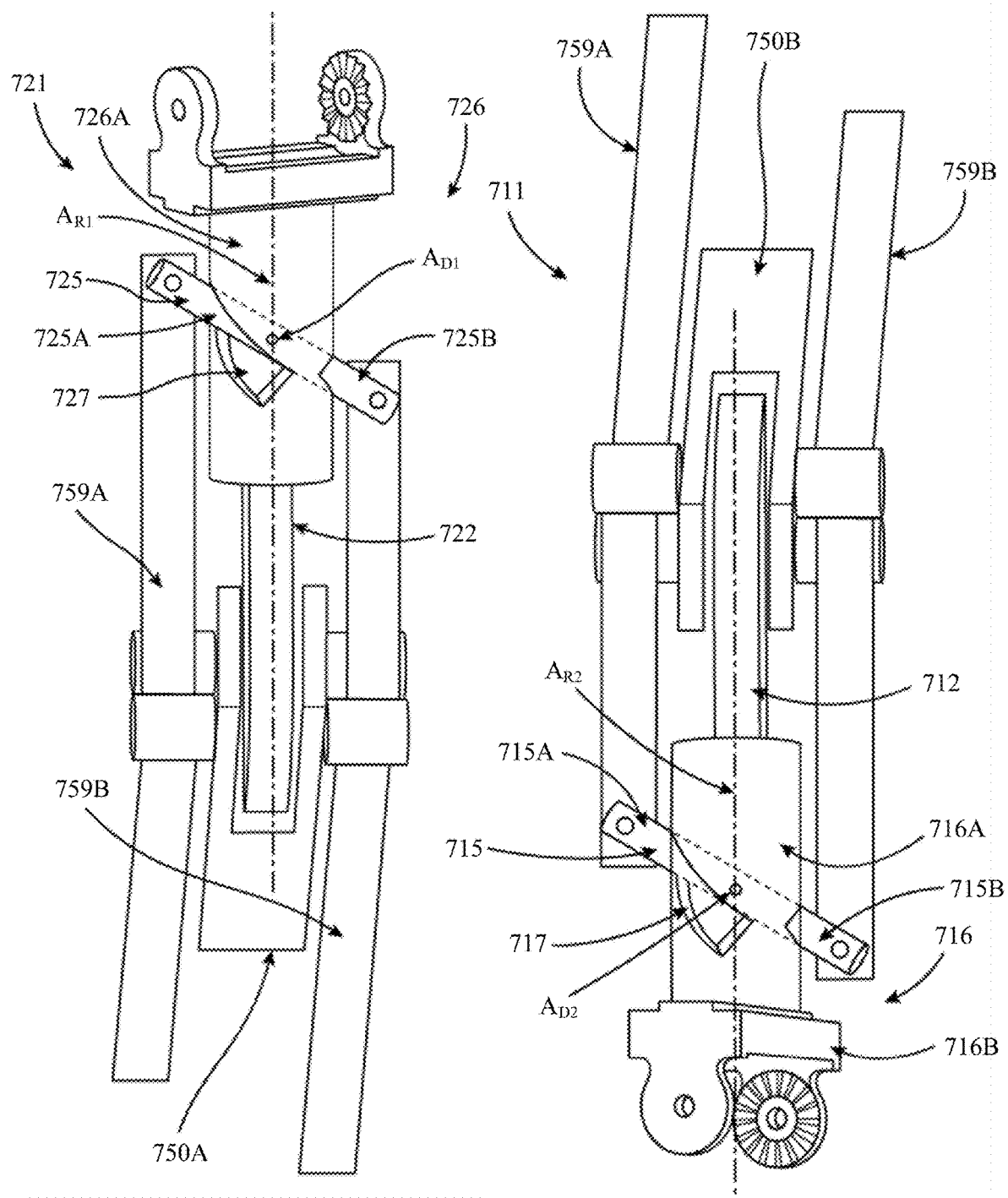
FIG. 7A  FIG. 7B

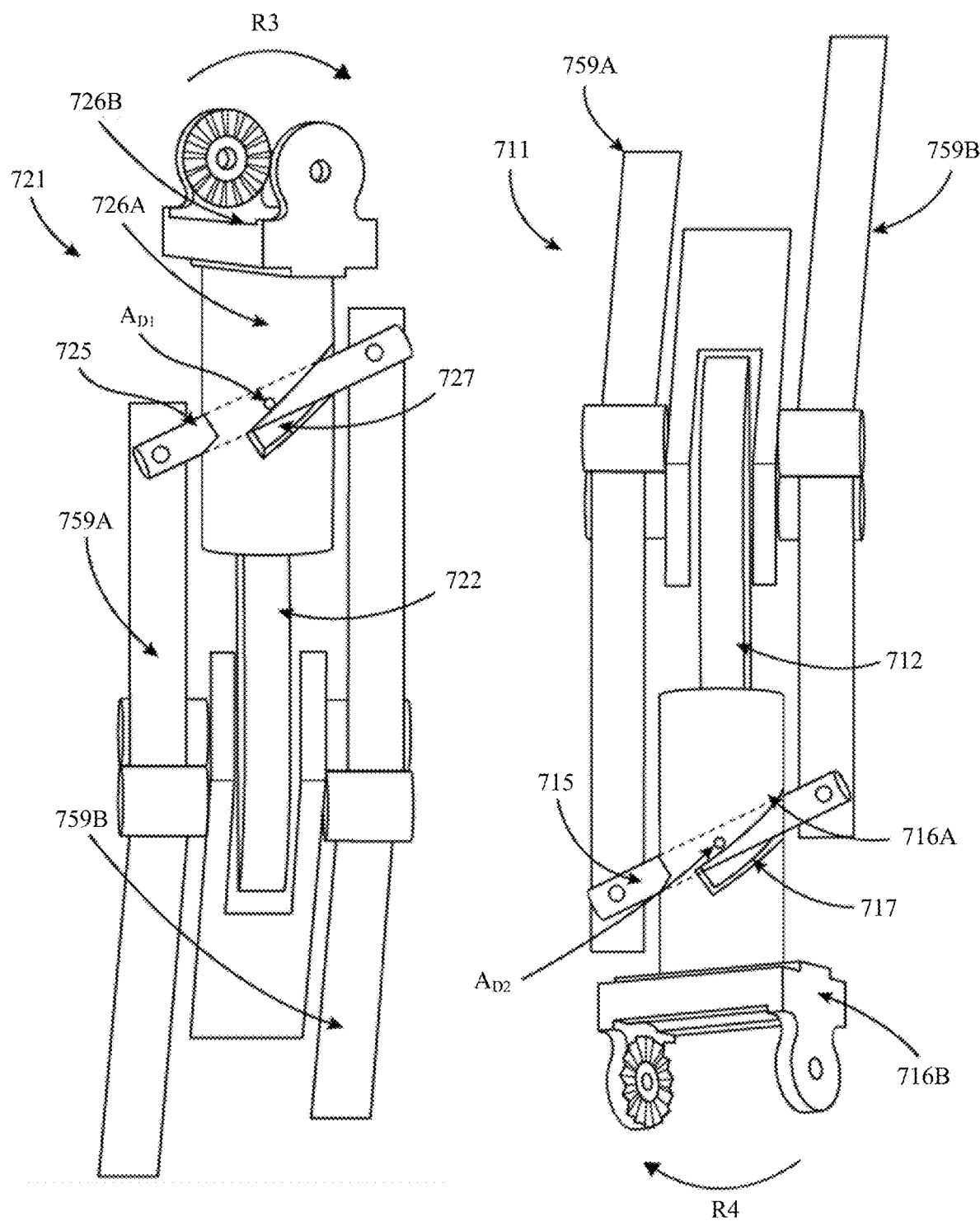
*FIG. 7E*    *FIG. 7F*

UNIVERSAL SCANNING SYSTEM FOR SONAR

FIELD OF THE INVENTION

Embodiments of the present invention relate generally to a universal scanning system for sonar, such as to enable utilization and resultant useful imagery for a sonar transducer assembly being swept through various orientations.

BACKGROUND OF THE INVENTION

Sonar images are often used by fishermen to assist the fishermen in navigating and identifying locations of interest. Where fishermen use sonar data, they frequently run into issues with the complexity and the number of devices required to obtain all the sonar data needed for fishing. A large amount of equipment is often required on a watercraft to create effective sonar systems, and this equipment may be difficult to install and may require significant maintenance costs. Scanning often requires complex systems including expensive equipment, with a large number of transducers being required to cover an entire scan volume. Some accomplish scanning by obtaining sonar data as the watercraft itself moves, but this may be less desirable and may require more difficult interpretation of past positioning by a user (e.g., as opposed to staying in one place and scanning).

BRIEF SUMMARY OF THE INVENTION

Various embodiments herein allow a sonar transducer assembly to be moved (e.g., reoriented, adjusted, steered, etc.) to various orientations to obtain sonar data. In some embodiments, the sonar transducer assemblies may be configured to move to any orientation below a horizontal plane, allowing sonar data to be obtained for effectively all portions of a body of water proximate to a watercraft.

A sonar transducer assembly may be swept in various planes. For example, the sonar transducer assembly may be swept in a horizontal plane or a vertical plane to help create a sensible and easy to understand sonar image for the user, but the sonar transducer assembly may be swept in other planes or in other sweeping patterns as well. A user may navigate to a location that they frequently navigate to such as a location proximate to their dock or to their favorite fishing spot. The user may then conduct a scan using the sonar transducer assembly to obtain a robust scan at that location. The scan may be performed to obtain sonar imagery in various directions. Additionally, scans may be performed while a watercraft moves. While it is contemplated that sonar transducer assemblies may be included on a watercraft, alternative embodiments are also contemplated where sonar transducer assemblies are attached at other locations such as at a dock, at a bridge, in an ice fishing hole, etc.

Various embodiments provided herein offer a cost effective approach for obtaining robust sonar imagery. Sonar images may be formed using low cost transducers and only a limited number of transducers may be required. Rather than requiring several transducers and other equipment to cover a full scan volume, a lesser number of transducer(s) may be used, with these transducer(s) moved to cover the full scan volume. Sonar transducer assemblies described in various embodiments herein may have a small amount of parts, and the design of these embodiments enable low cost production.

Accordingly, the sonar transducer assemblies may be swept so that wide downscan images or forward scan images may be obtained without moving the watercraft.

In an example embodiment, a system is provided for forming a sonar image from a sonar transducer assembly on a watercraft. The system comprises the sonar transducer assembly attached to the watercraft. The sonar transducer assembly is configured to be turned to any orientation below a first horizontal plane corresponding to a surface of a body of water that the watercraft is on. The system also comprises an orientation sensor configured to generate orientation data for the sonar transducer assembly, an actuator, one or more processors, and one or more memory devices. The memory device(s) include computer program code configured to, when executed, cause the one or more processors to perform various tasks. These tasks include receiving first sonar data from the sonar transducer assembly when the sonar transducer assembly is oriented in a first orientation, with the first sonar data providing data regarding a first underwater volume. The tasks also include receiving first orientation data from the orientation sensor when the sonar transducer assembly is in the first orientation and causing the actuator to generate movement of the sonar transducer assembly so that the sonar transducer assembly moves from the first orientation to a second orientation, with at least a portion of the sonar transducer assembly moving in a sweeping motion along an arc as the sonar transducer assembly moves from the first orientation to the second orientation. The tasks also include receiving second sonar data from the sonar transducer assembly when the sonar transducer assembly is oriented in the second orientation, with the second sonar data providing data regarding a second underwater volume and with the second underwater volume being at least partially different from the first underwater volume. The tasks also include receiving second orientation data from the orientation sensor when the sonar transducer assembly is in the second orientation. Additionally, the tasks include creating a sonar image using the first sonar data, the second sonar data, the first orientation data, and the second orientation data. The sonar image includes a first image portion including image data representative of the first sonar data and a second image portion including image data representative of the second sonar data. The second image portion is at least partially different from the first image portion, and the first image portion is positioned relative to the second image portion in a manner that correlates to the arc of the sweeping motion from the first orientation of the sonar transducer assembly to the second orientation of the sonar transducer assembly and portrays a real-world differential position of the first sonar data relative to the second sonar data within the sonar image.

In some embodiments, the orientation of the sonar transducer assembly may change at a constant rate as the sonar transducer assembly moves from the first orientation to the second orientation. In some embodiments, the sonar transducer assembly may move from the first orientation to the second orientation with a portion of the sonar transducer assembly moving along the arc within a vertical plane. In some embodiments, the sonar transducer assembly may move from the first orientation to the second orientation with a portion of the sonar transducer assembly moving along the arc within a horizontal plane. In some embodiments, the second image portion may be at least partially offset from the first image portion in a vertical direction within the sonar image. In some embodiments, the second image portion may be at least partially offset from the first image portion in a horizontal direction within the sonar image.

In some embodiments, the system may also include a display, and the computer program code may be configured to, when executed, cause the one or more processors to cause the sonar image to be presented on the display. Additionally, in some embodiments, the sonar image may include one or more indications that illustrate an orientation of the first sonar data and the second sonar data utilized in the sonar image with respect to the watercraft. Furthermore, in some embodiments, the one or more indications may further illustrate the orientation of the first sonar data and the second sonar data utilized in the sonar image with respect to the surface of the body of water. In some embodiments, the one or more indications may form a first indication illustrating the orientation of the first sonar data and the second sonar data utilized in the sonar image with respect to the watercraft and a second indication illustrating the orientation of the first sonar data and the second sonar data utilized in the sonar image with respect to the surface of the body of water.

In some embodiments, the sonar transducer assembly may be configured to generate a single beam at one time. In some embodiments, the sonar transducer assembly may be configured to generate multiple beams at one time.

In some embodiments, the sonar image may have expanded coverage relative to another sonar image formed from a stationary sonar transducer assembly. In some embodiments, movement of the sonar transducer assembly may occur when motors on the watercraft are not being used to generate thrust.

In another example embodiment, a method for forming a sonar image from a sonar transducer assembly on a watercraft is provided. The method comprises receiving first sonar data from the sonar transducer assembly when the sonar transducer assembly is oriented in a first orientation, with the first sonar data providing data regarding a first underwater volume. The method also comprises receiving first orientation data from an orientation sensor when the sonar transducer assembly is in the first orientation. The method also comprises causing an actuator to generate movement of the sonar transducer assembly so that the sonar transducer assembly moves from the first orientation to a second orientation, with at least a portion of the sonar transducer assembly moving in a sweeping motion along an arc as the sonar transducer assembly moves from the first orientation to the second orientation. The method also comprises receiving second sonar data from the sonar transducer assembly when the sonar transducer assembly is oriented in the second orientation, with the second sonar data providing data regarding a second underwater volume and with the second underwater volume being at least partially different from the first underwater volume. The method also comprises receiving second orientation data from the orientation sensor when the sonar transducer assembly is in the second orientation. Furthermore, the method comprises creating a sonar image using the first sonar data, the second sonar data, the first orientation data, and the second orientation data. The sonar image includes a first image portion including image data representative of the first sonar data and a second image portion including image data representative of the second sonar data, with the second image portion being at least partially different from the first image portion and with the first image portion being positioned relative to the second image portion in a manner that correlates to the arc of the sweeping motion from the first orientation of the sonar transducer assembly to the second orientation of the sonar transducer assembly and portrays a real-world differential position of the first sonar data relative to the second sonar data within the sonar image.

In some embodiments, the sonar transducer assembly may be configured to be turned to any orientation below a first horizontal plane corresponding to a surface of a body of water that the watercraft is on. Additionally, in some embodiments, the sonar image may include one or more indications that illustrate an orientation of the first sonar data and the second sonar data utilized in the sonar image with respect to the watercraft. Furthermore, in some embodiments, the one or more indications may also illustrate the orientation of the first sonar data and the second sonar data utilized in the sonar image with respect to the surface of the body of water. In some embodiments, the one or more indications may form a first indication illustrating the orientation of the first sonar data and the second sonar data utilized in the sonar image with respect to the watercraft and a second indication illustrating the orientation of the first sonar data and the second sonar data utilized in the sonar image with respect to the surface of the body of water.

In another example embodiment, a non-transitory computer readable medium is provided having stored thereon software instructions that, when executed by a processor, cause the processor to form a sonar image from a sonar transducer assembly on a watercraft. The sonar image is be formed by performing various tasks. These tasks include receiving first sonar data from the sonar transducer assembly when the sonar transducer assembly is oriented in a first orientation, with the first sonar data providing data regarding a first underwater volume. The tasks also include receiving first orientation data from an orientation sensor when the sonar transducer assembly is in the first orientation. Additionally, the tasks also include causing an actuator to generate movement of the sonar transducer assembly so that the sonar transducer assembly moves from the first orientation to a second orientation, with at least a portion of the sonar transducer assembly moving in a sweeping motion along an arc as the sonar transducer assembly moves from the first orientation to the second orientation. The tasks also include receiving second sonar data from the sonar transducer assembly when the sonar transducer assembly is oriented in the second orientation, with the second sonar data providing data regarding a second underwater volume and with the second underwater volume being at least partially different from the first underwater volume. Furthermore, the tasks also include receiving second orientation data from the orientation sensor when the sonar transducer assembly is in the second orientation. The tasks also include creating a sonar image using the first sonar data, the second sonar data, the first orientation data, and the second orientation data, with the sonar image including a first image portion including image data representative of the first sonar data and a second image portion including image data representative of the second sonar data. The second image portion is at least partially different from the first image portion, and the first image portion is positioned relative to the second image portion in a manner that correlates to the arc of the sweeping motion from the first orientation of the sonar transducer assembly to the second orientation of the sonar transducer assembly and portrays a real-world differential position of the first sonar data relative to the second sonar data within the sonar image.

BRIEF DESCRIPTION OF THE DRAWINGS

Figure 1A:
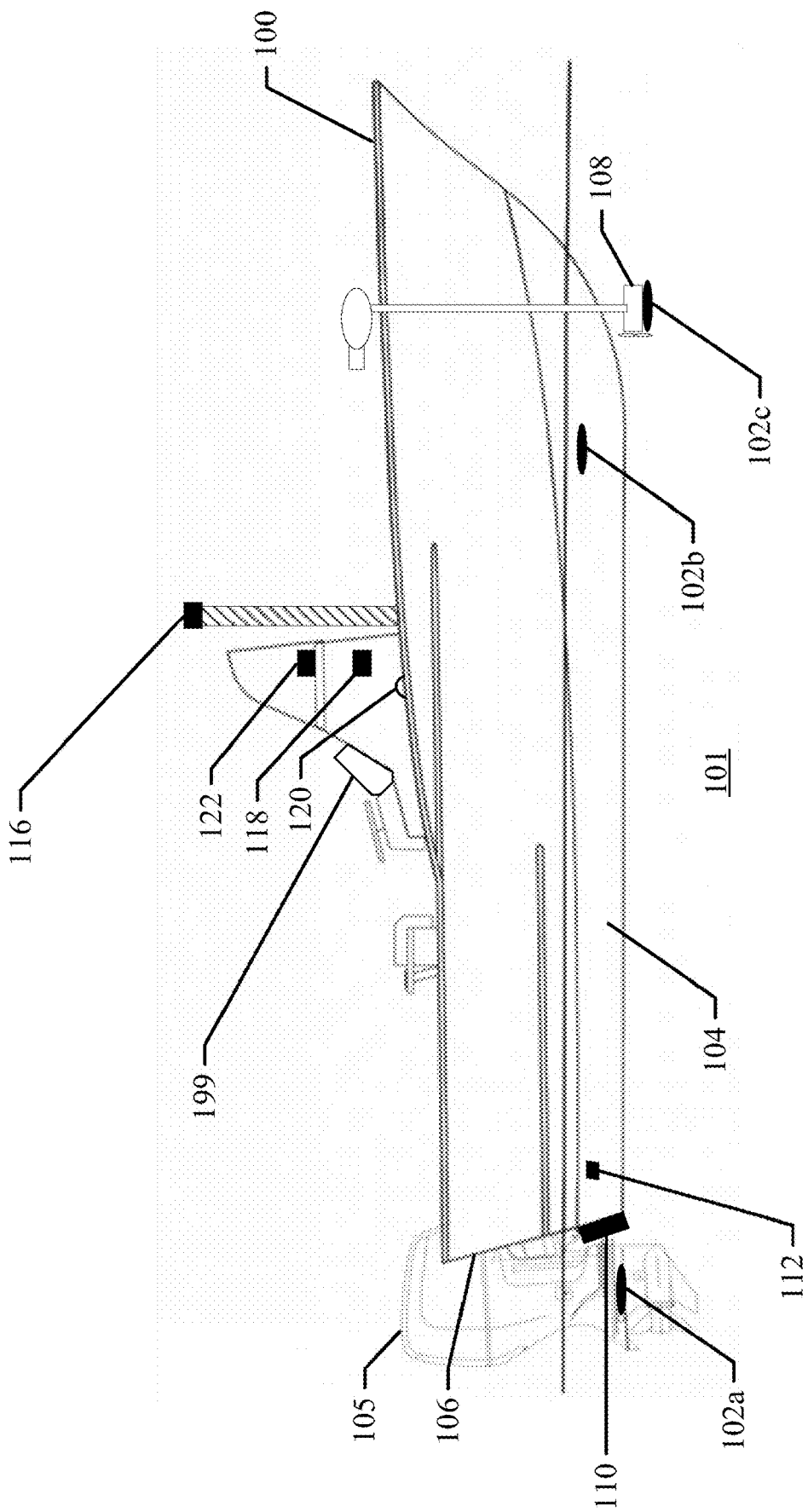
Figure 1B:
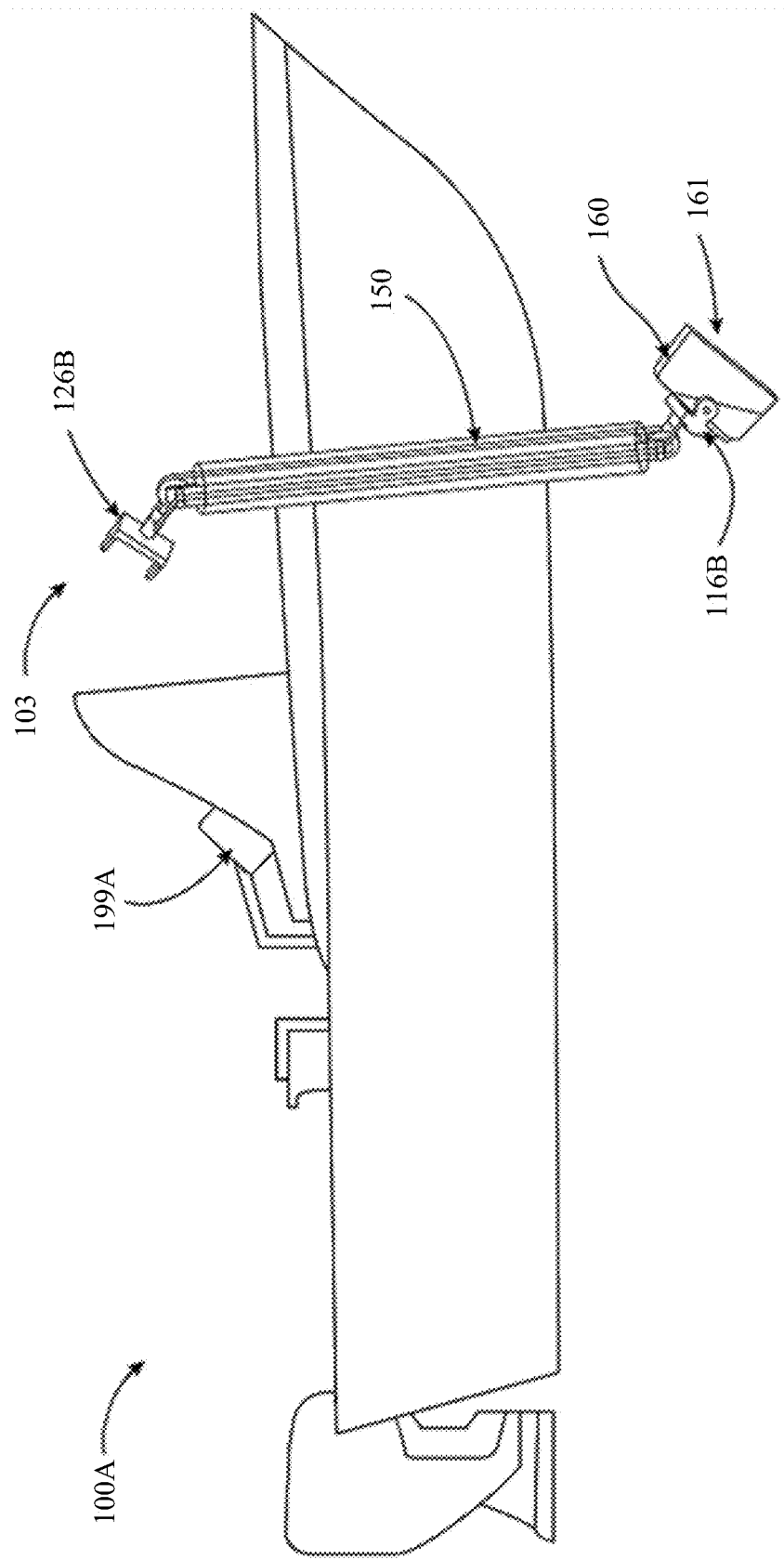
Figure 1C:
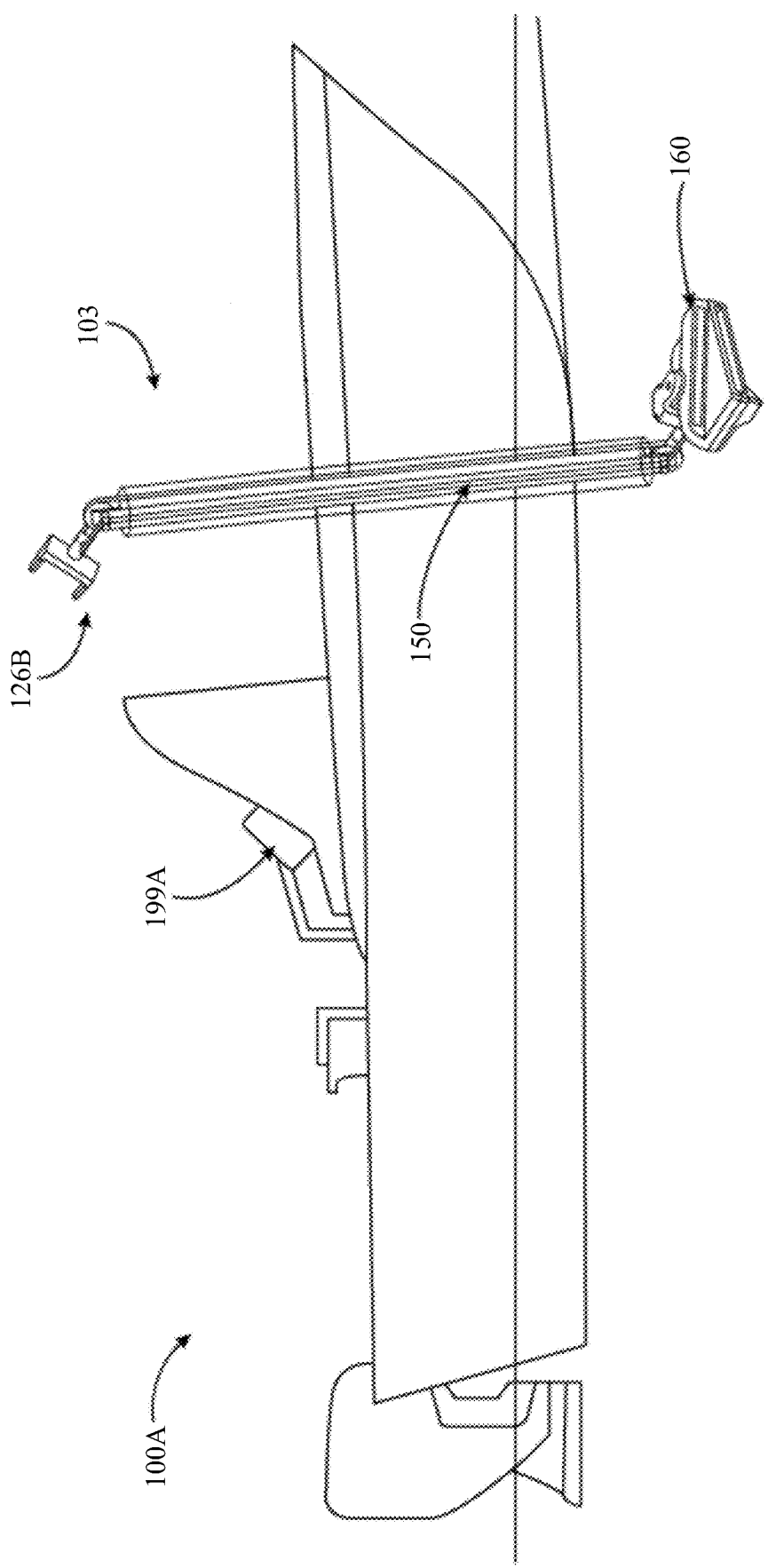
Figure 2A:
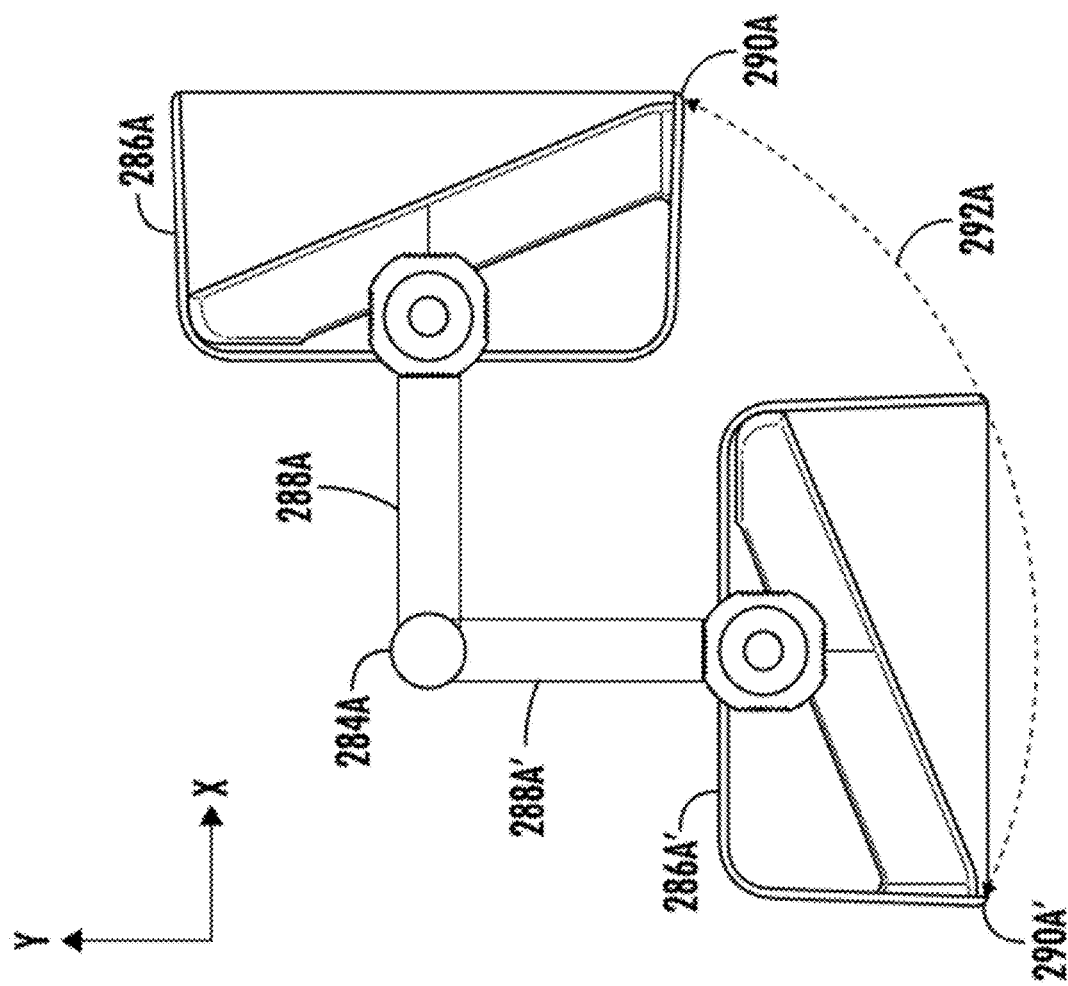
Figure 2B:
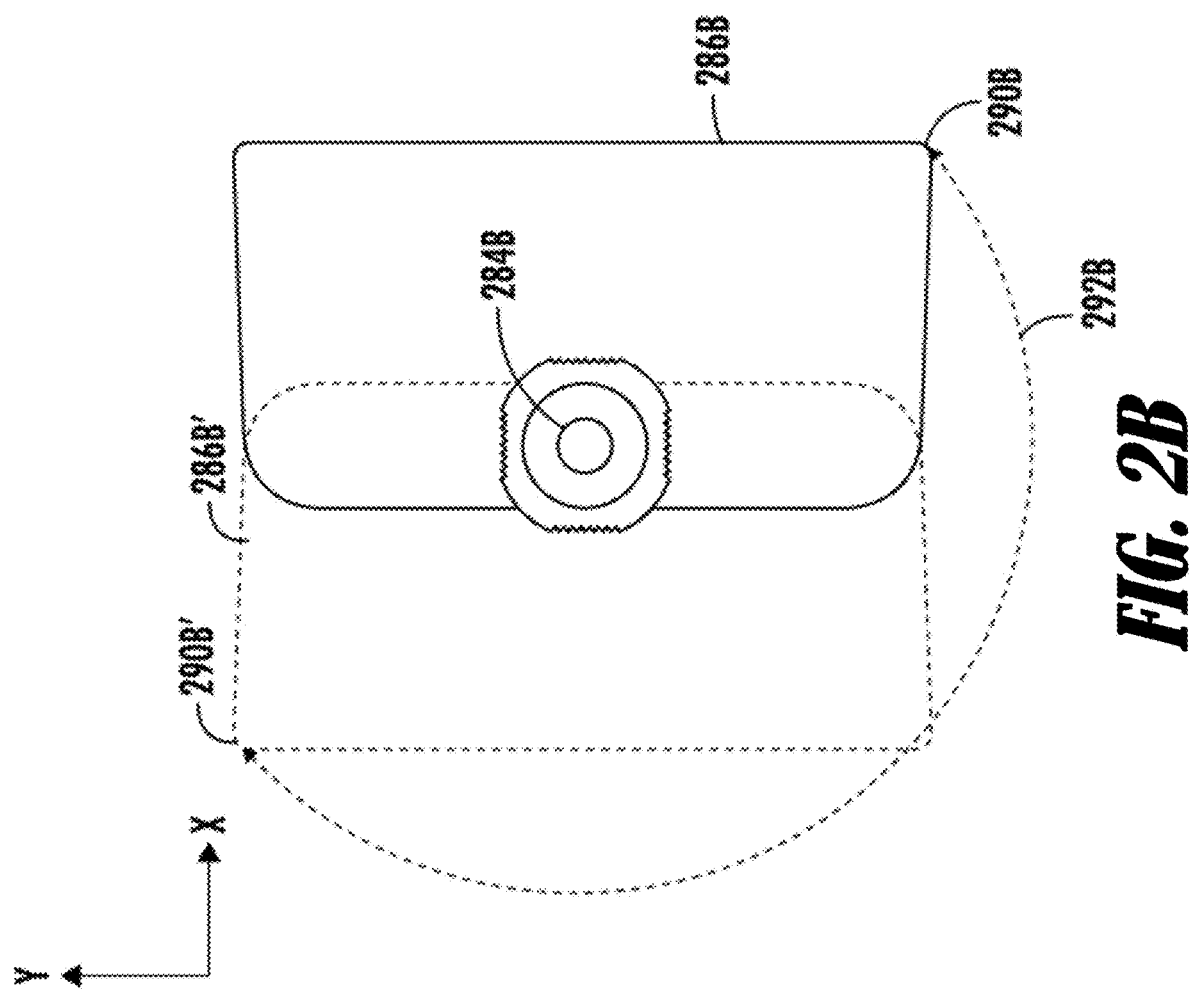
Figure 2C:
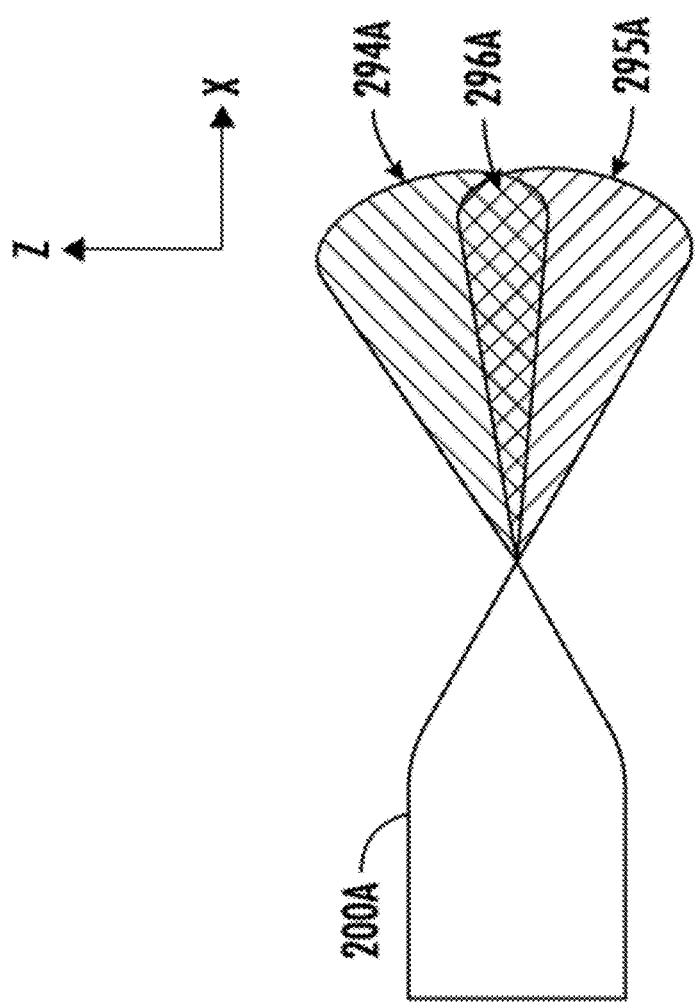
Figure 2D:
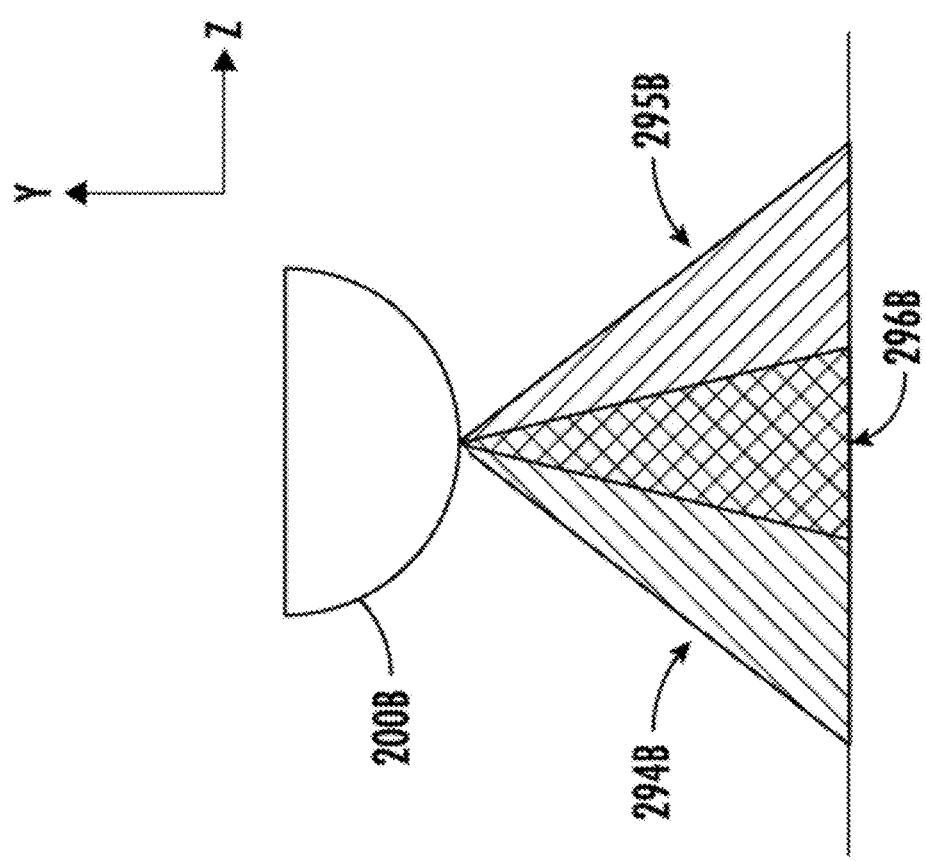
Figure 3A:
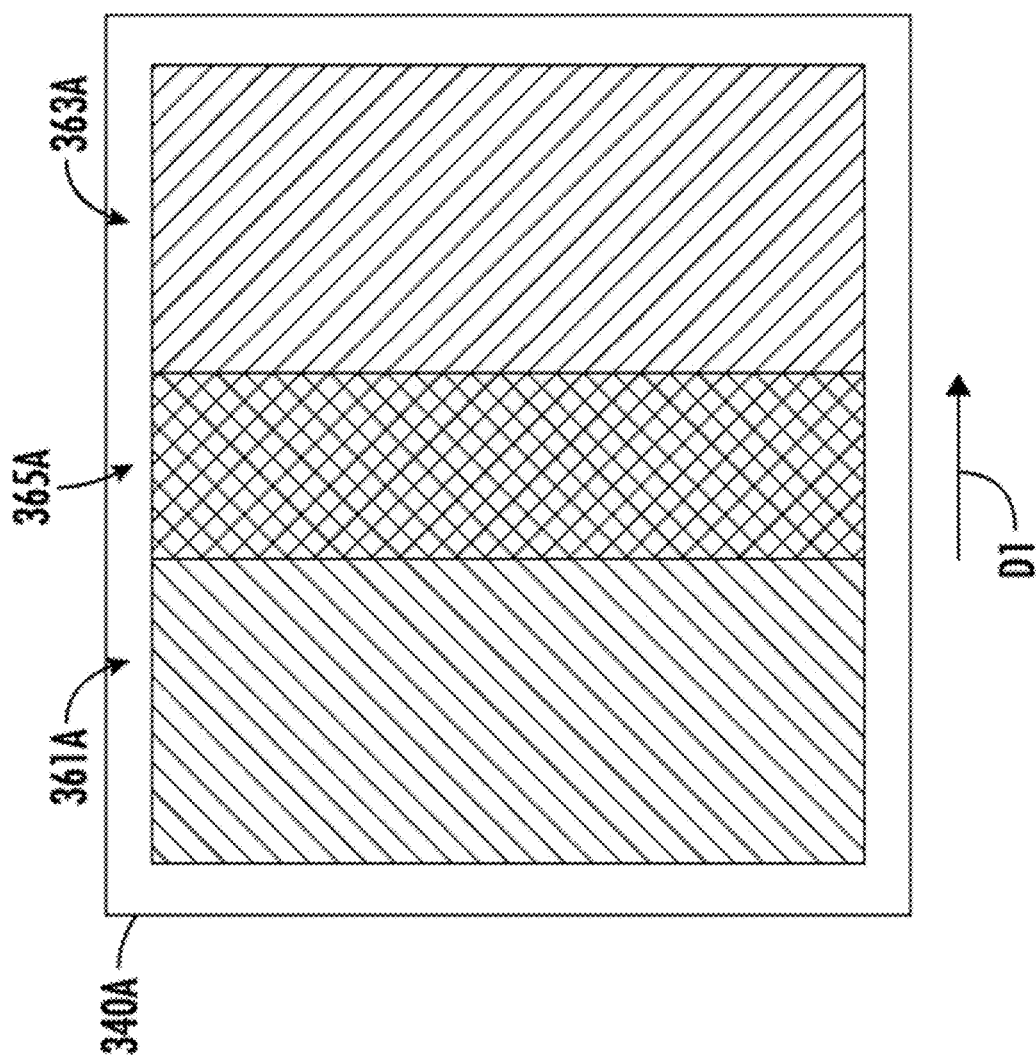
Figure 4A:
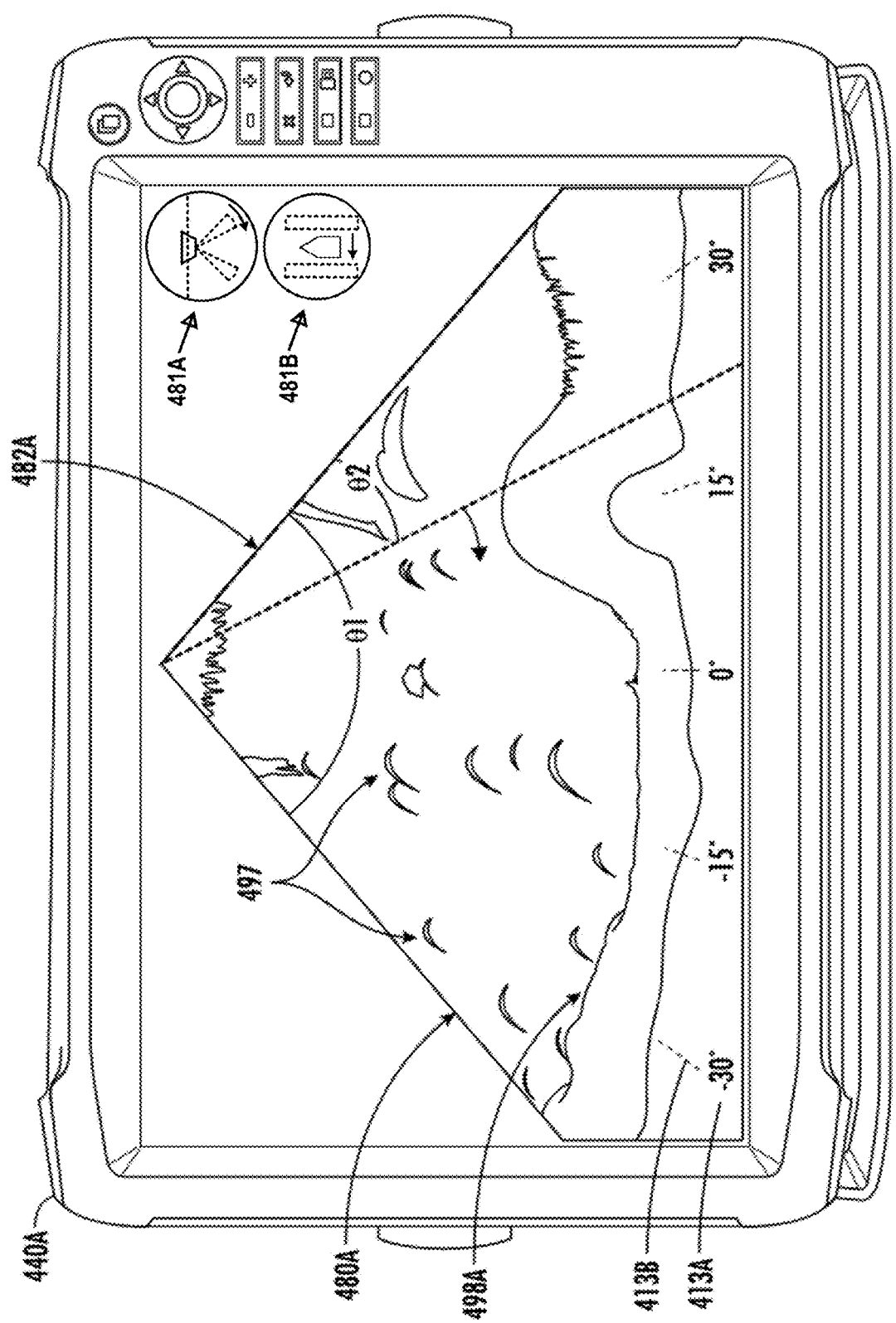
Figure 4B:
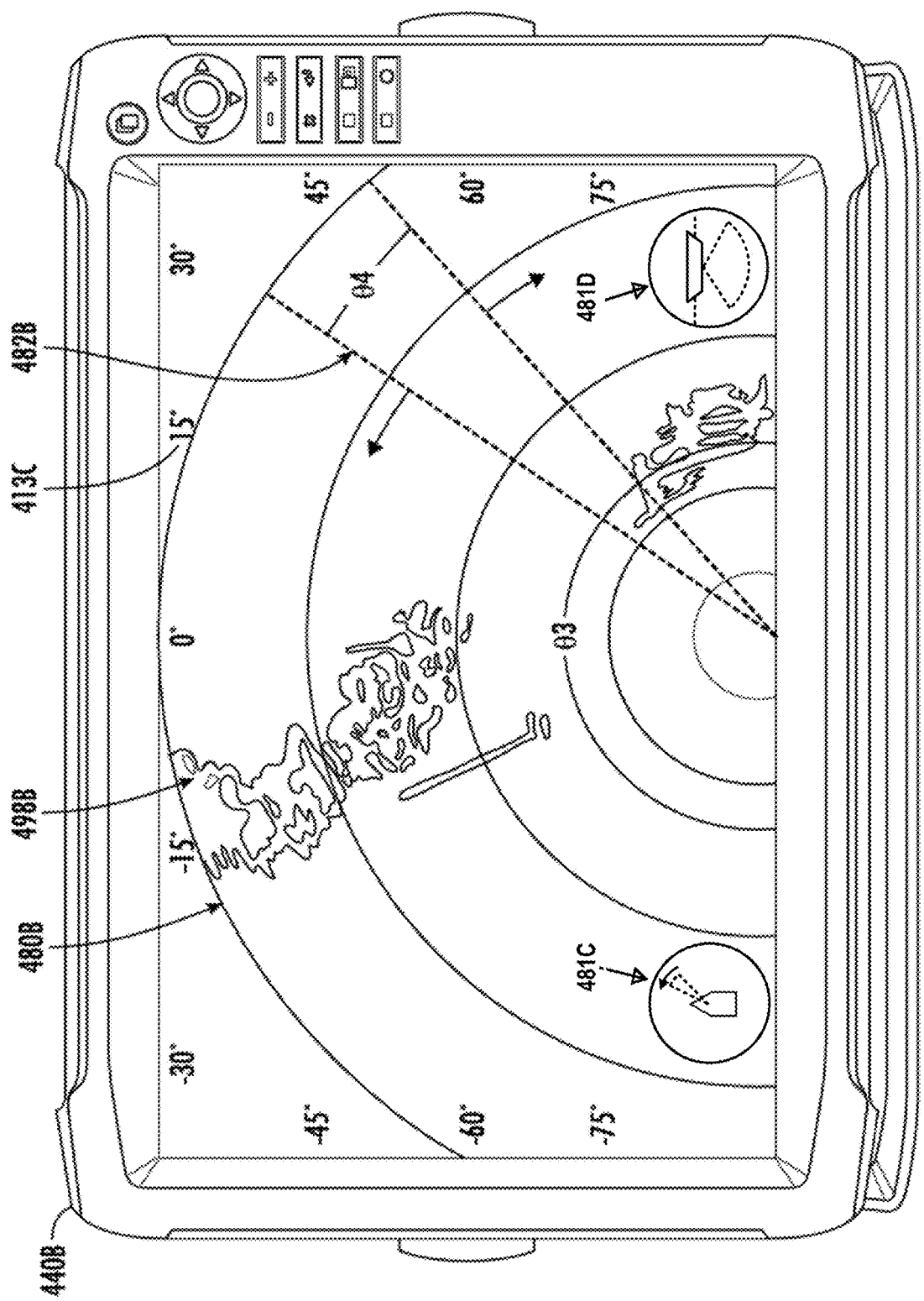
Figure 4C:
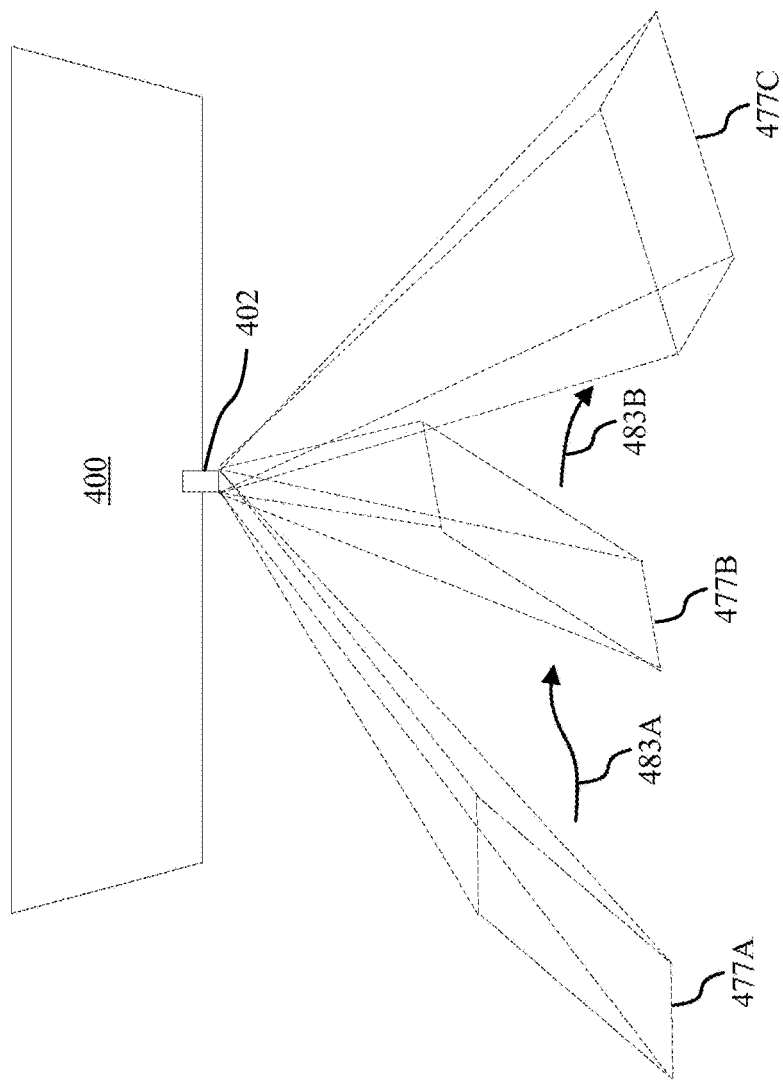
Figure 4D:
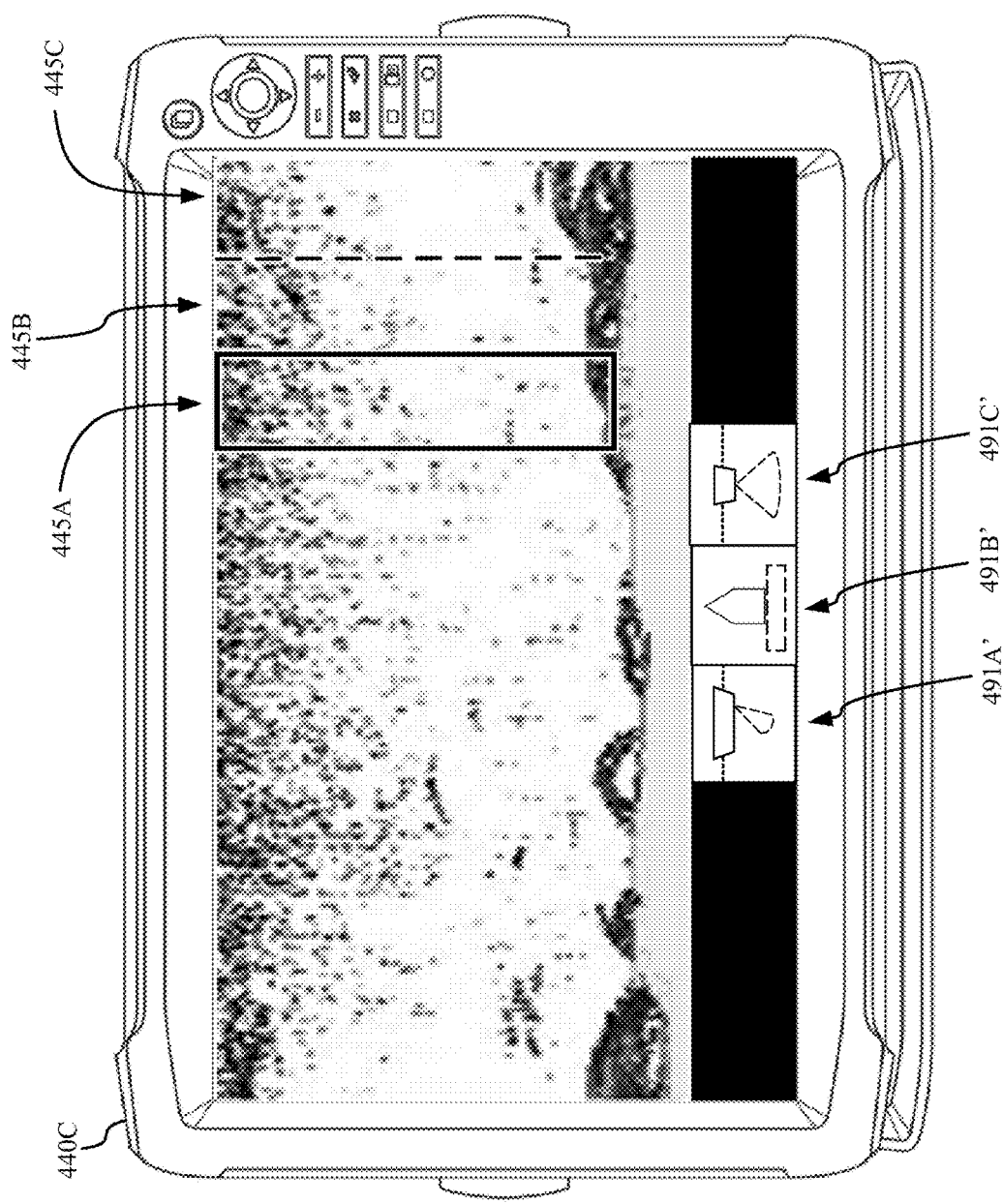
Figure 4E:
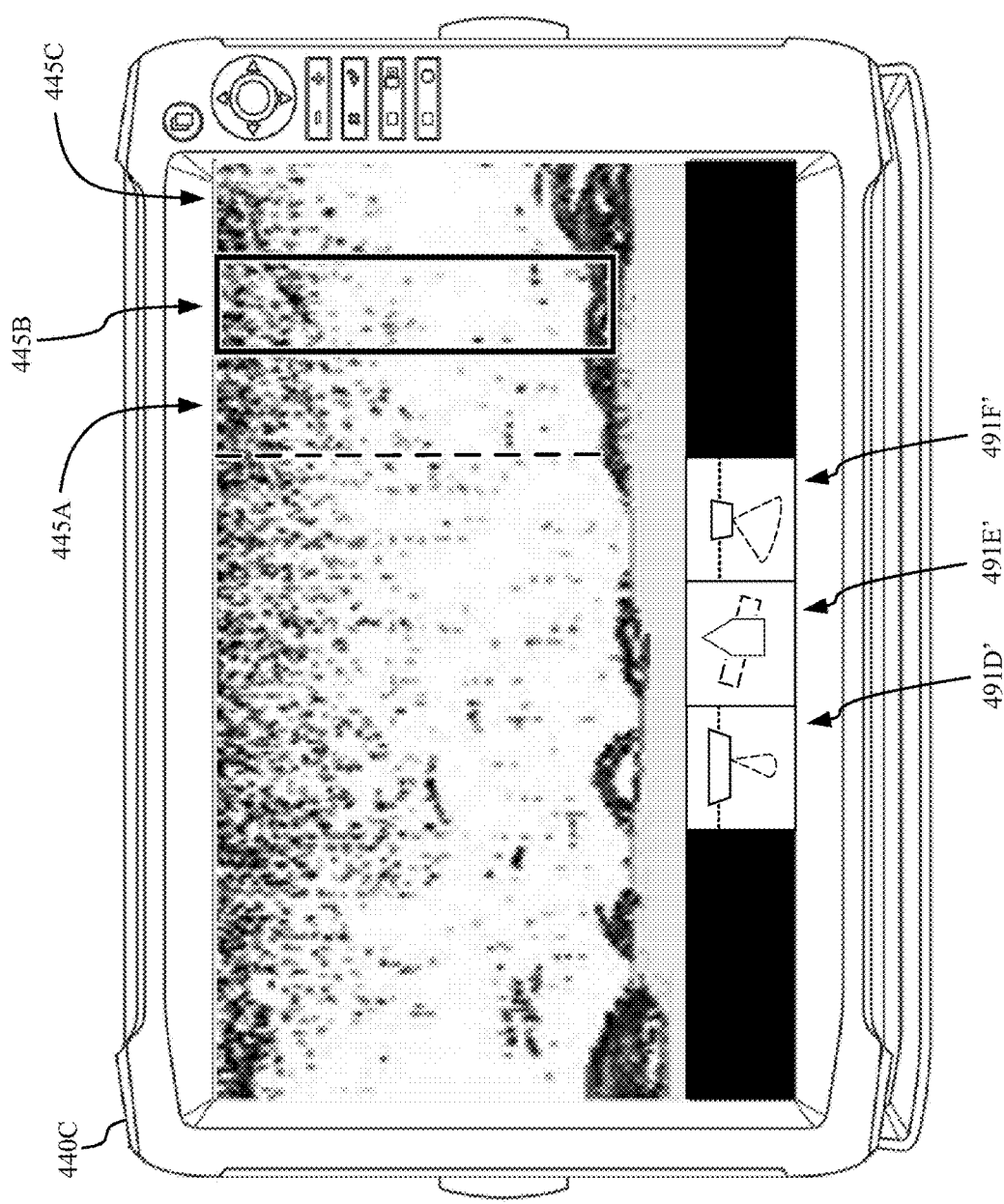
Figure 4F:
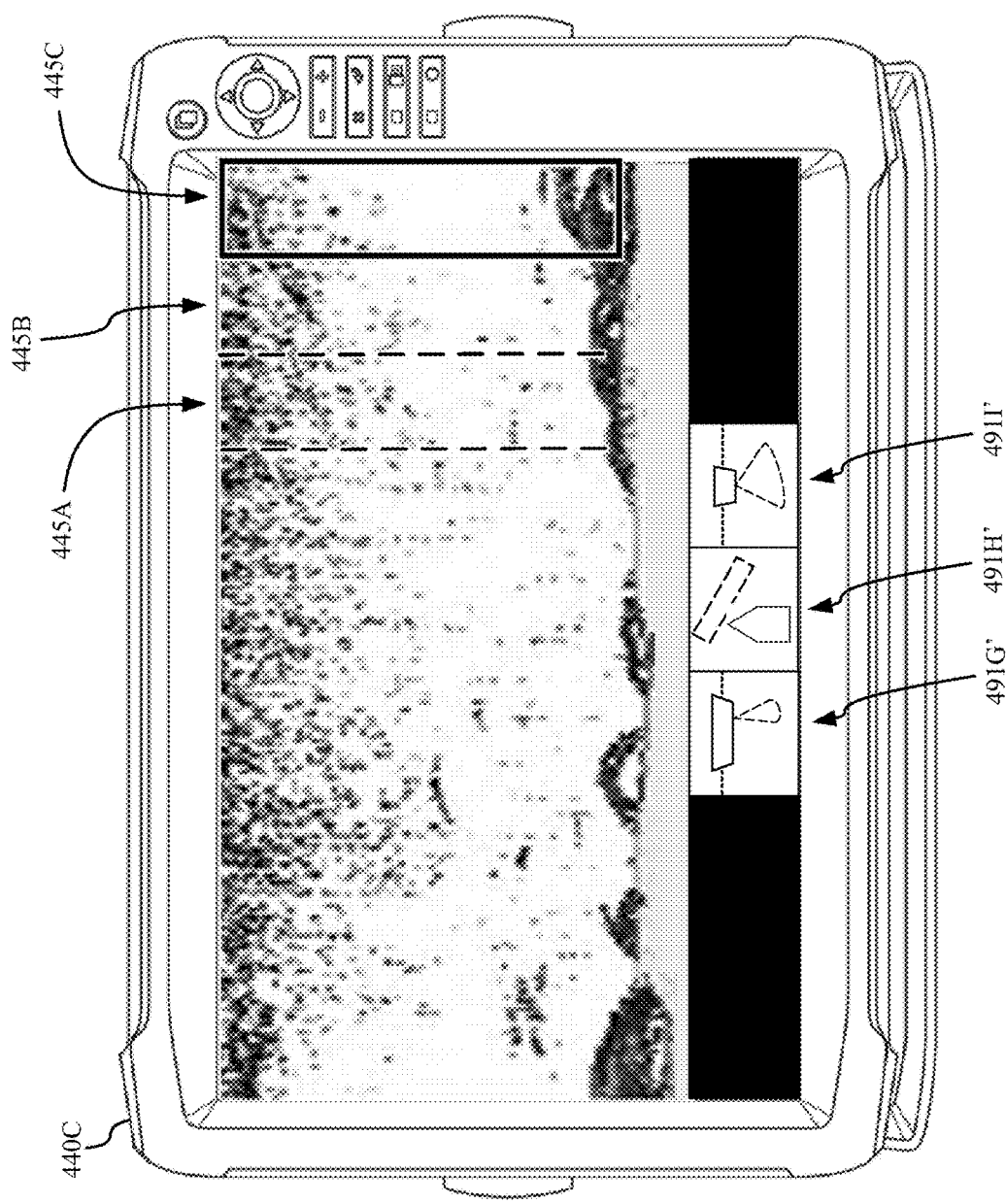
Figure 5A:
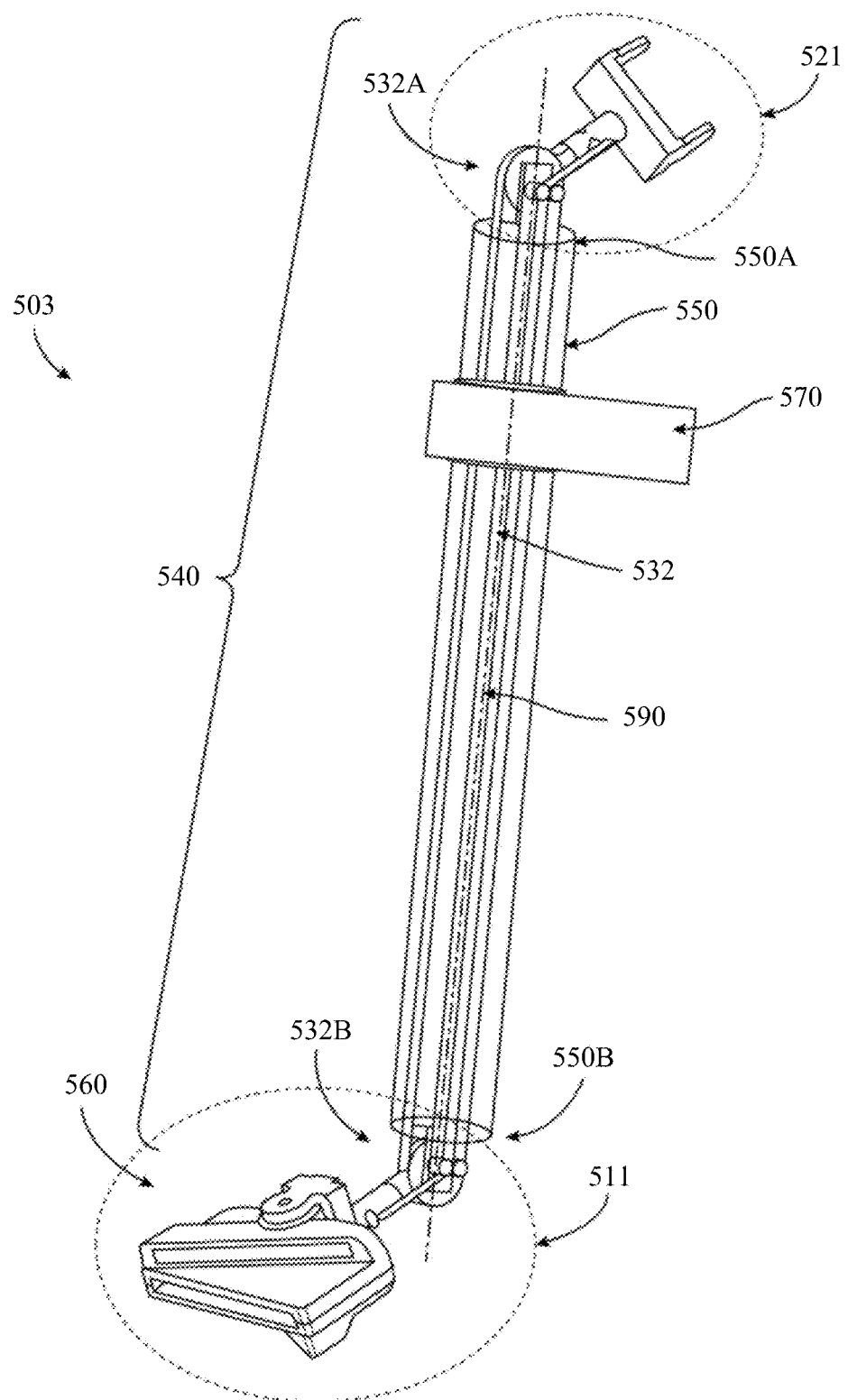
Figure 5B:
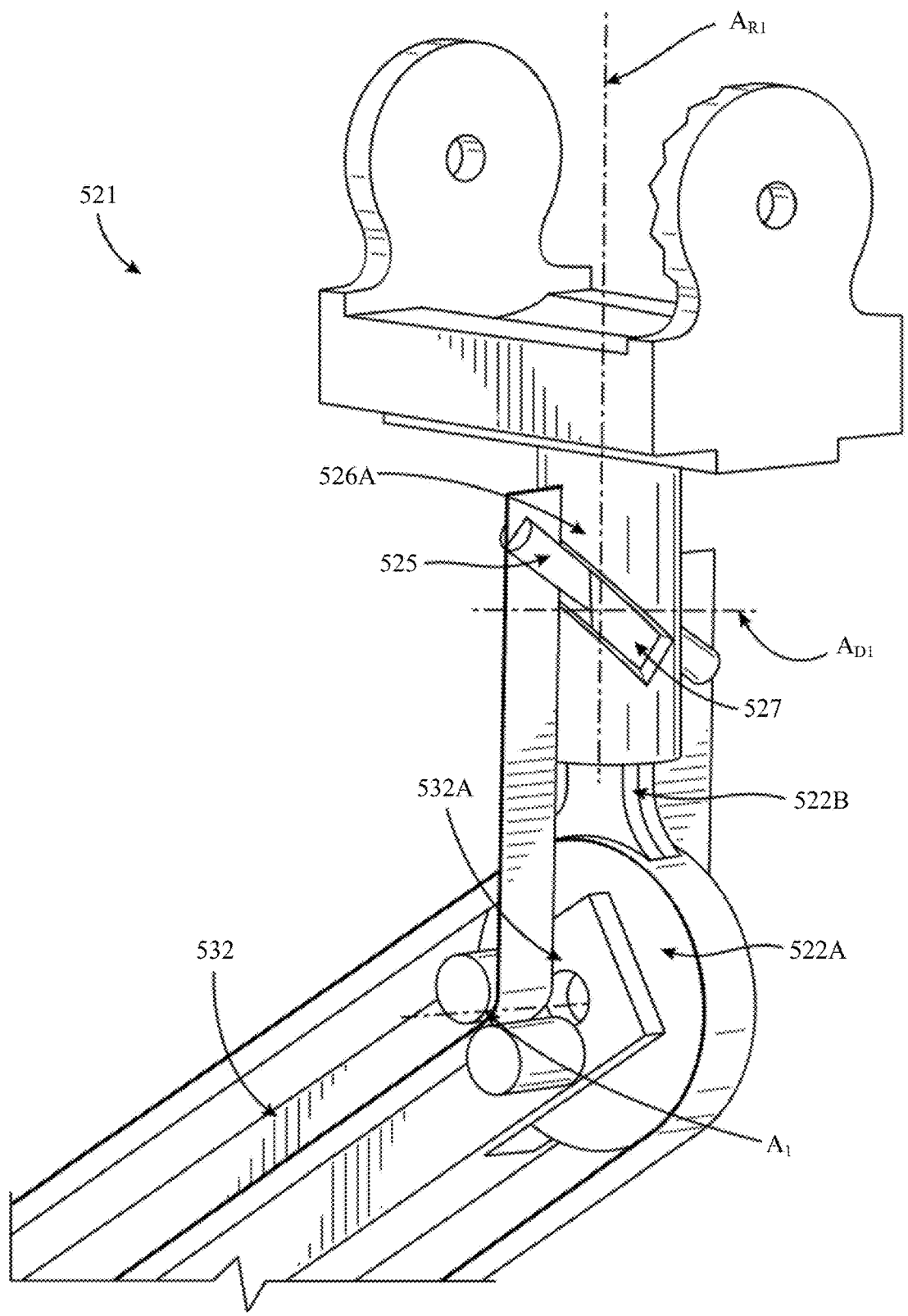
Figure 5C:
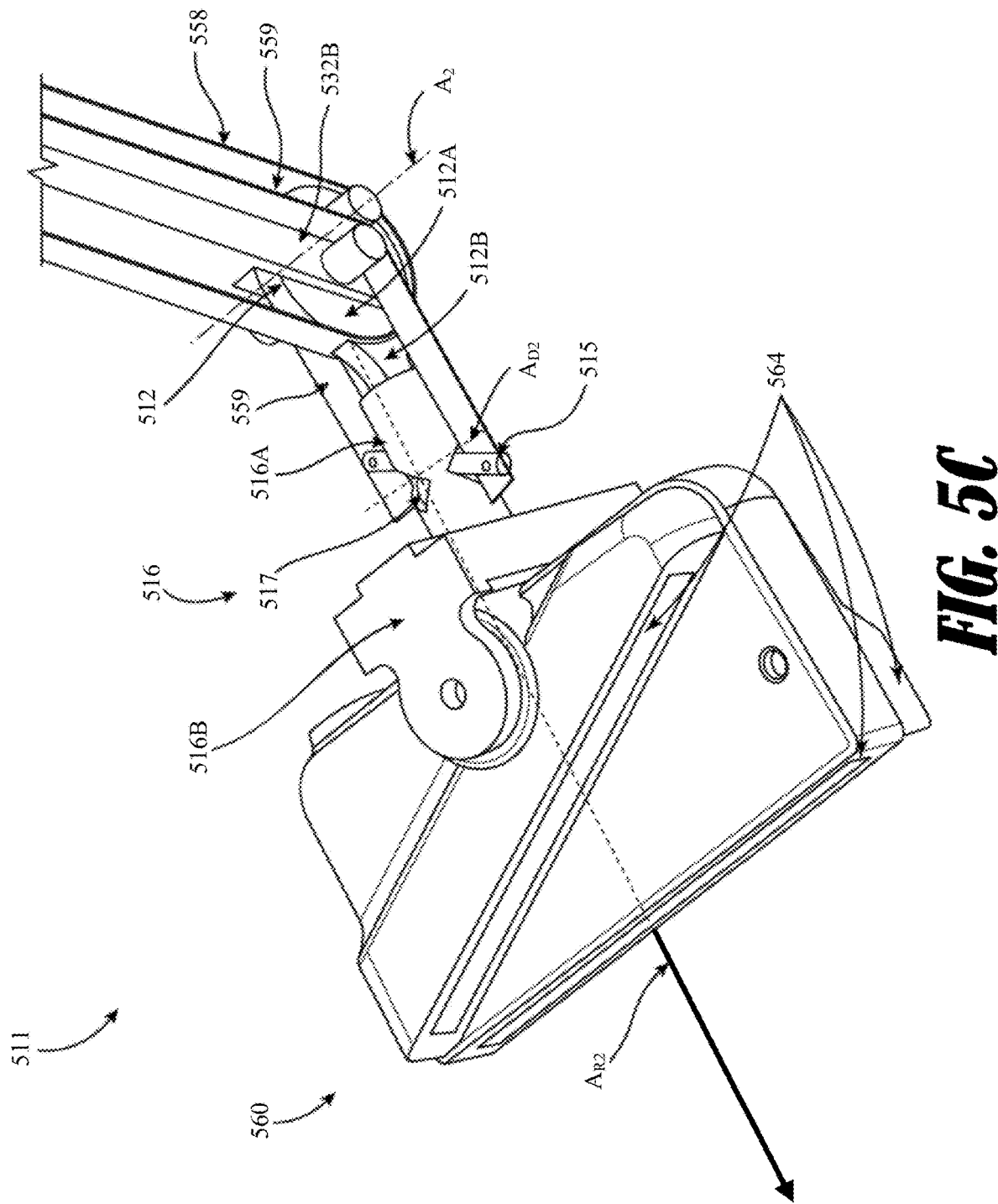
Figure 5D:
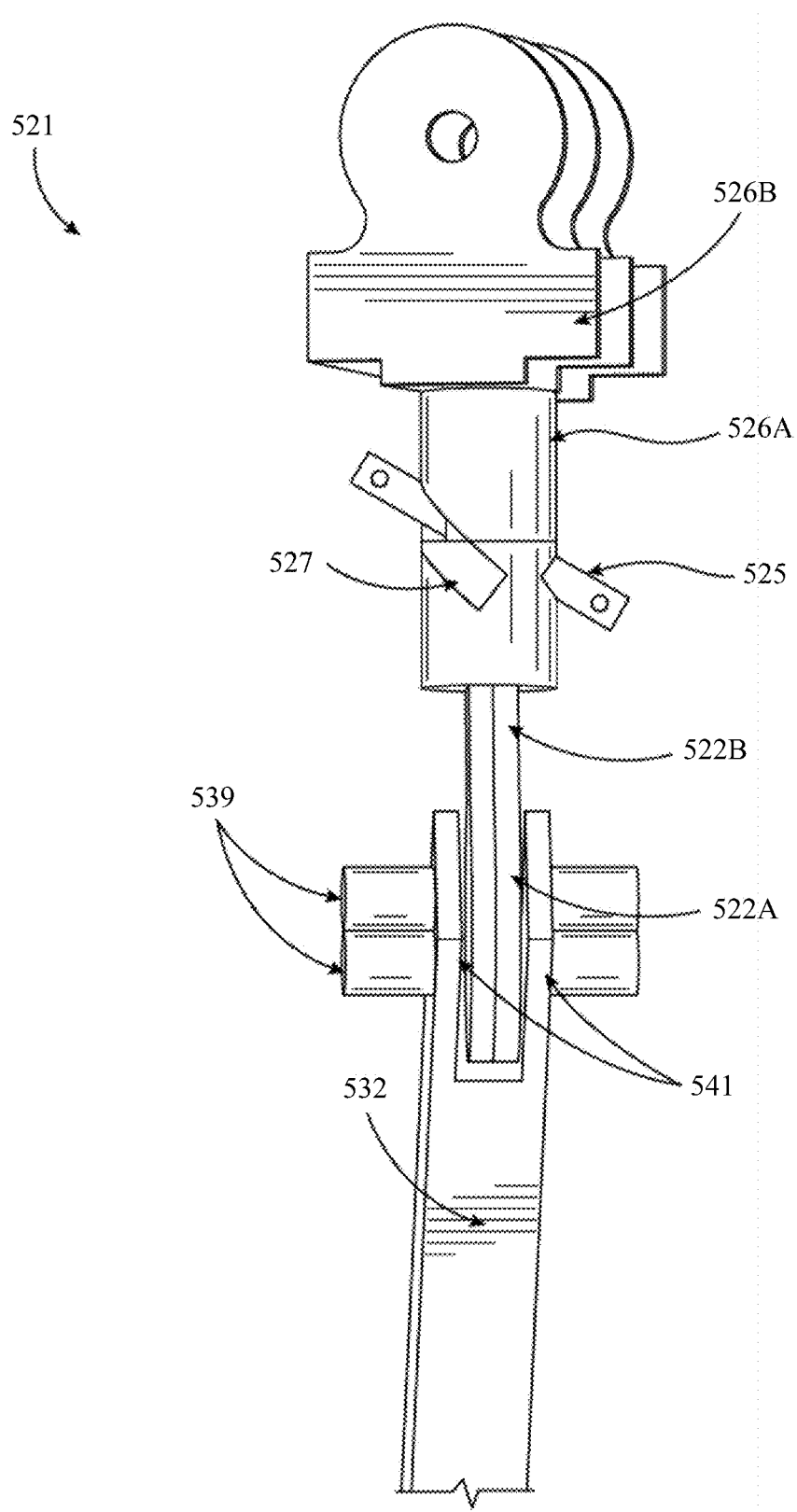
Figure 5E:
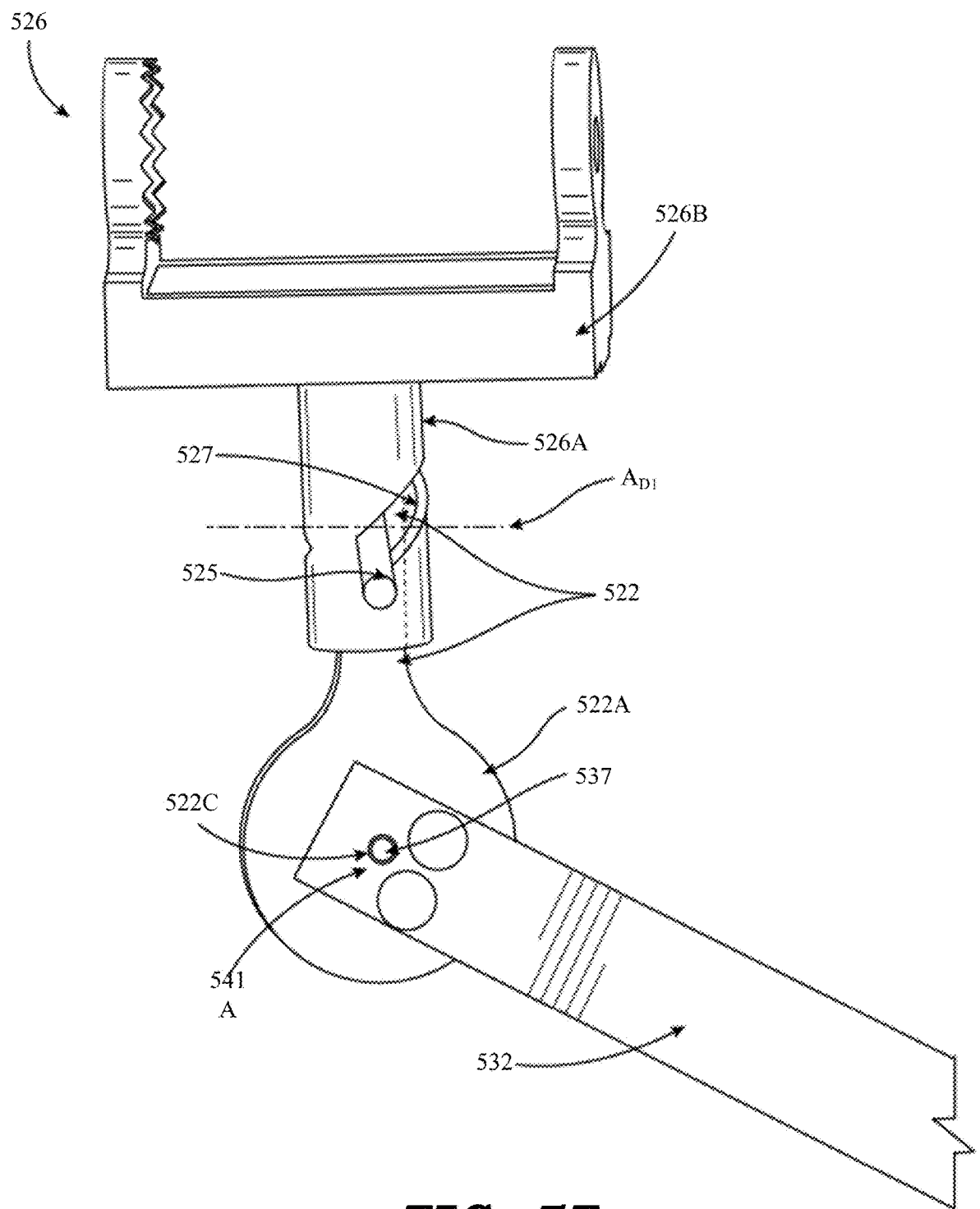
Figure 5F:
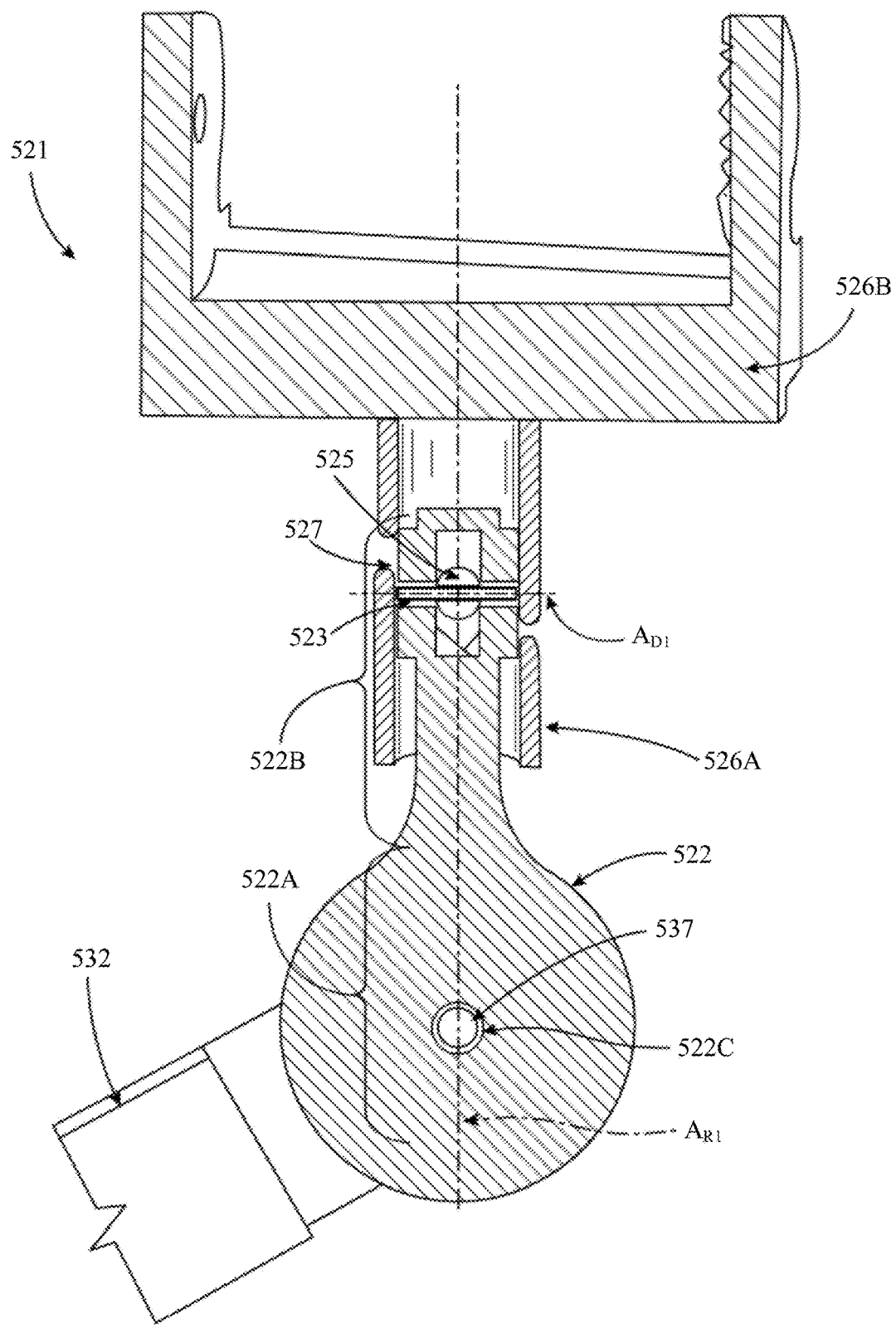
Figure 5G:
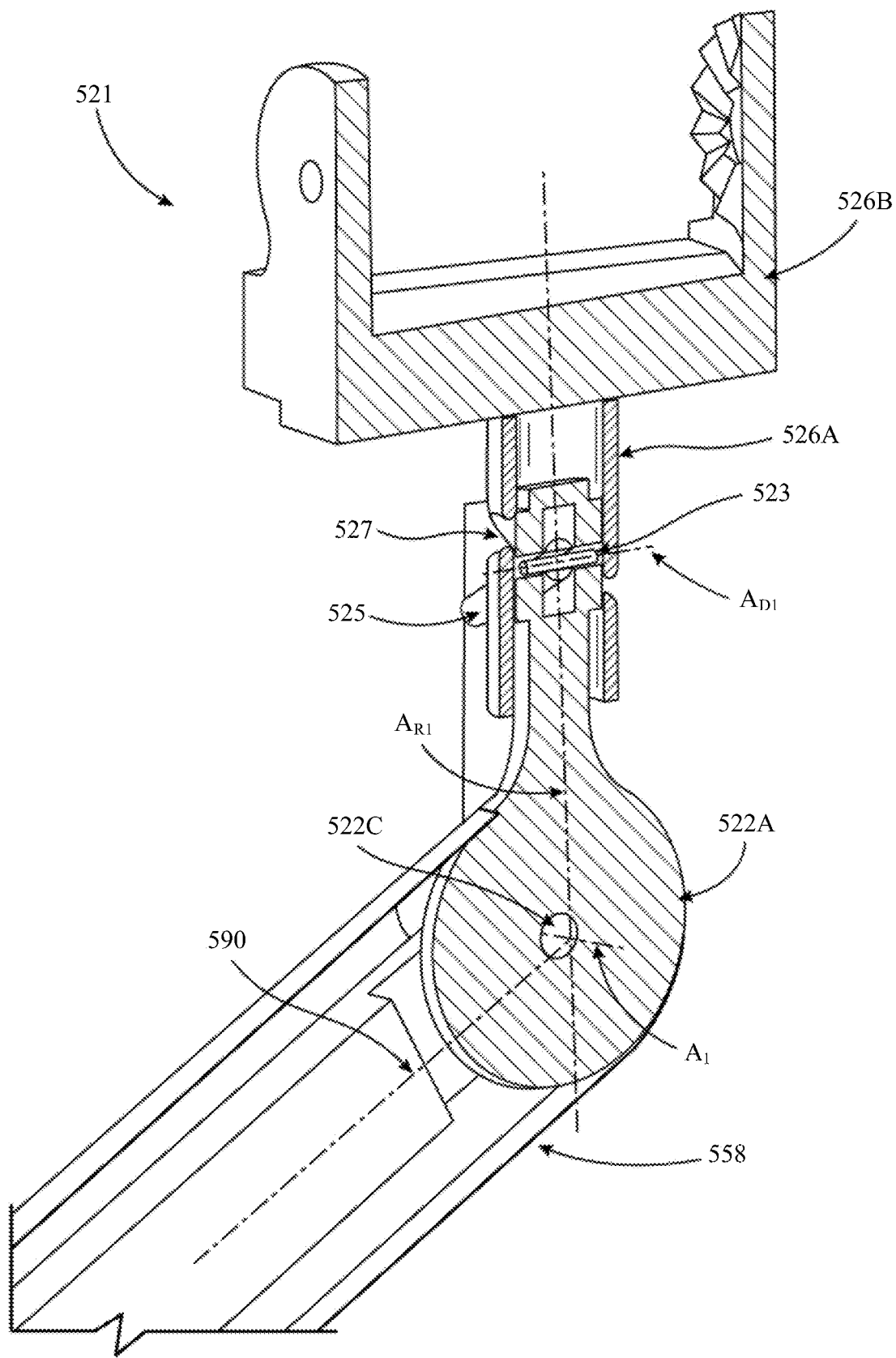
Figure 5H:
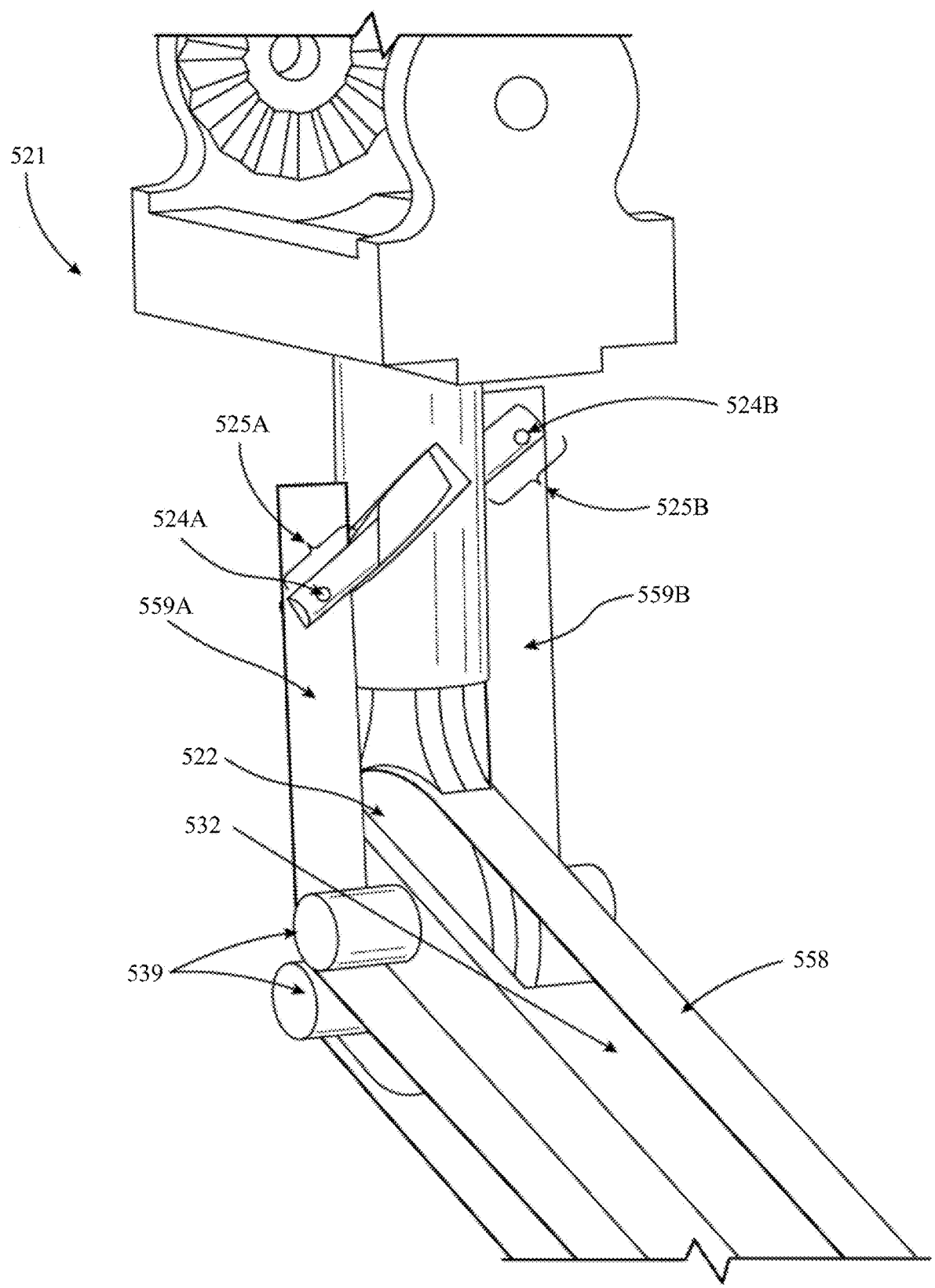
Figure 6A:
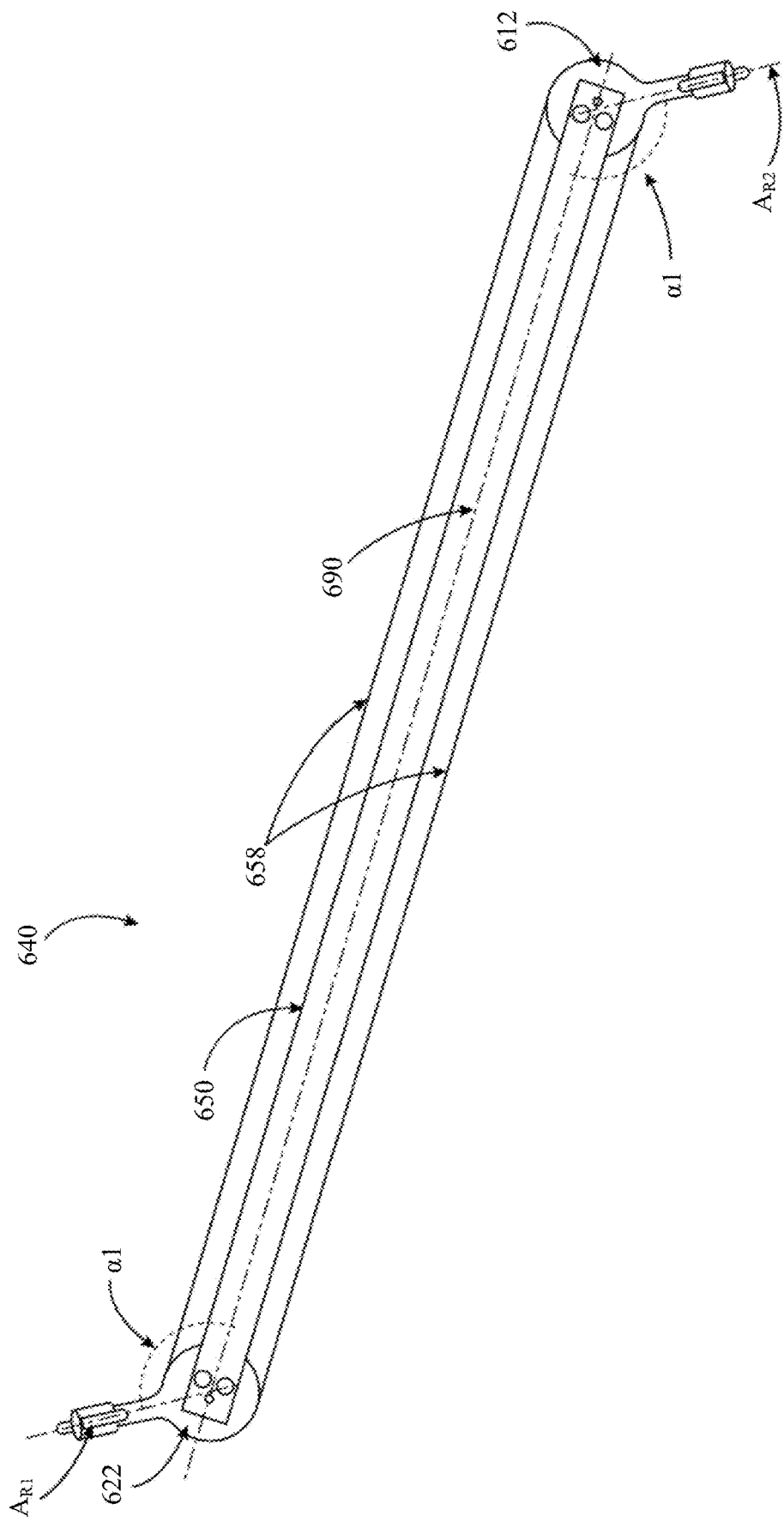
Figure 6B:
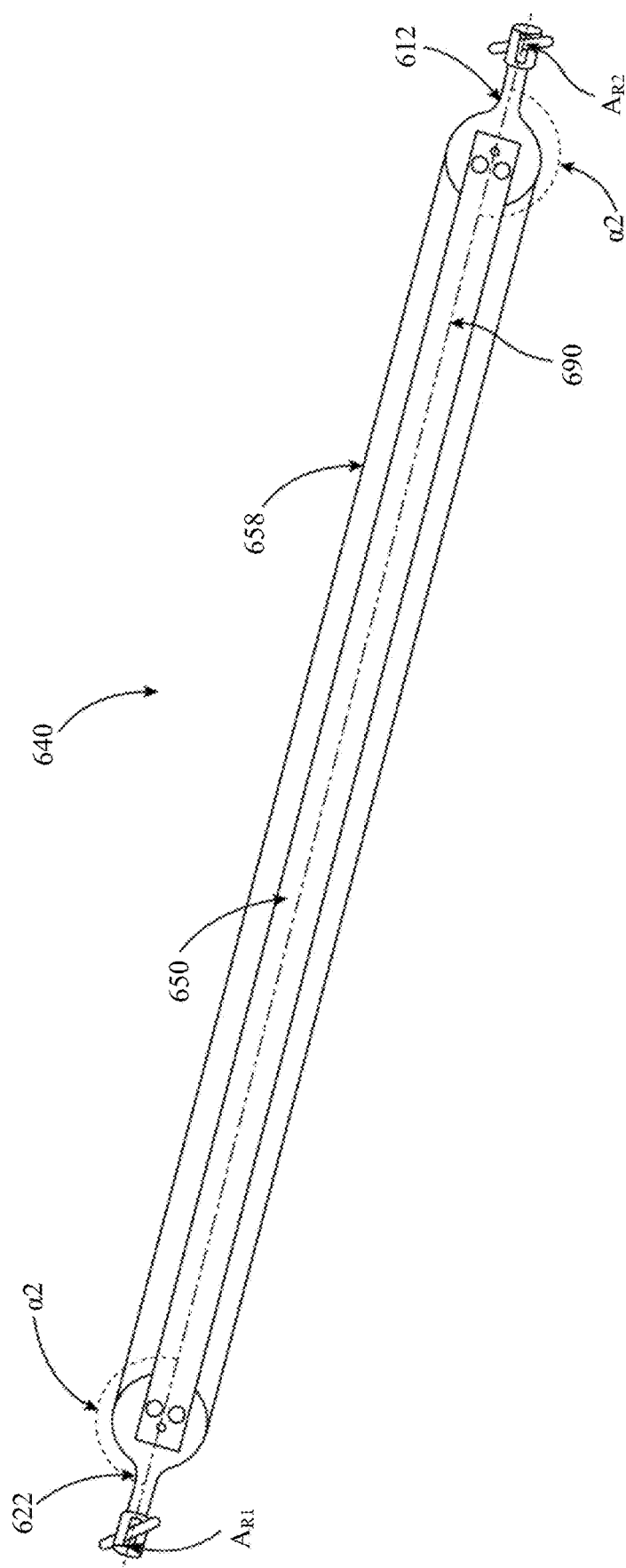
Figure 6C:
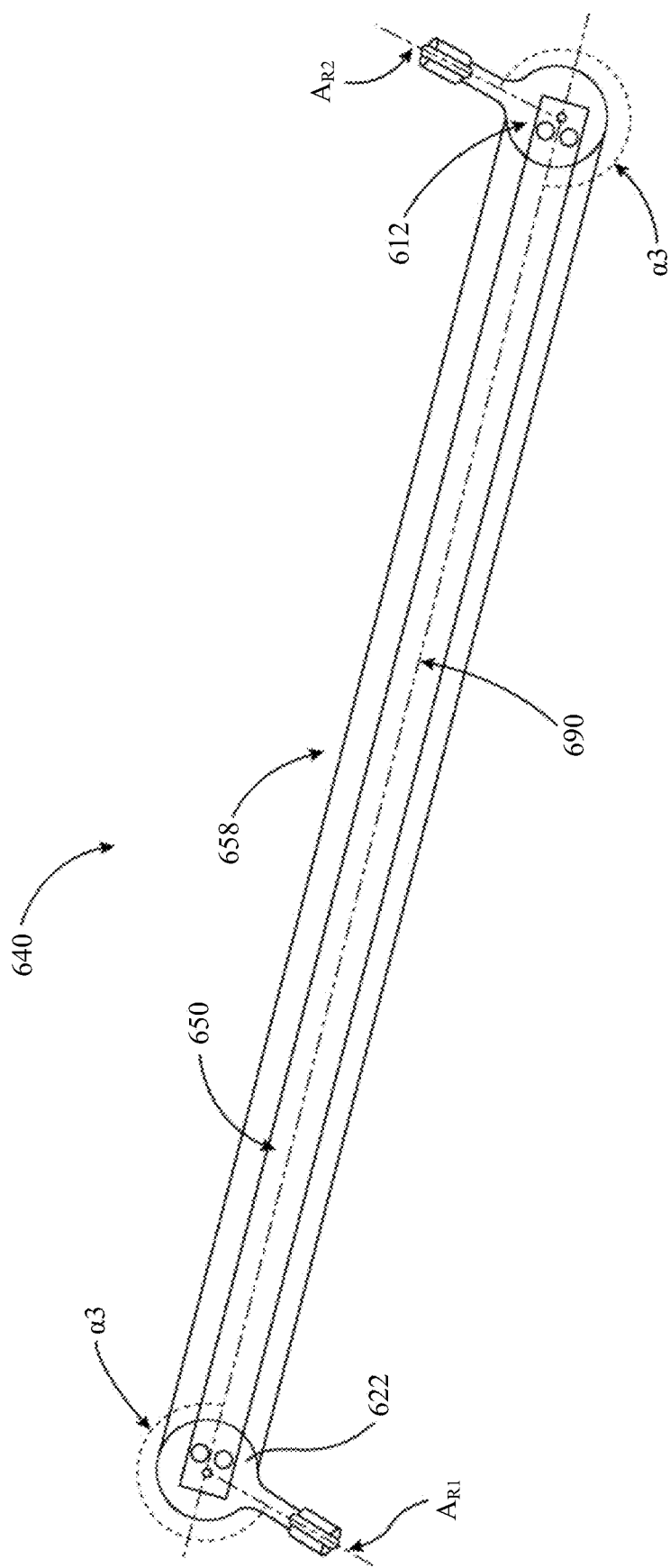
Figure 8:
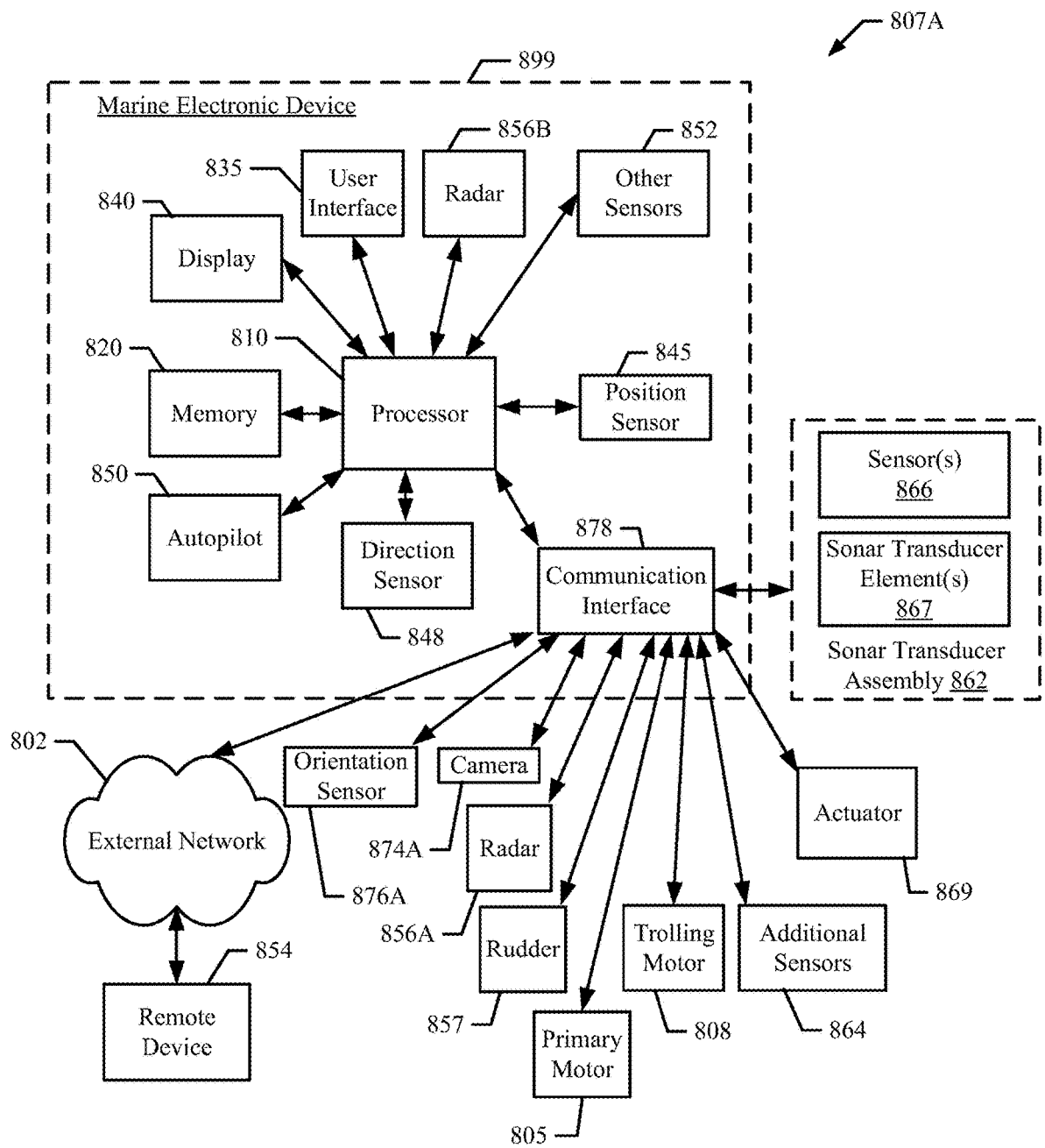
Figure 9:
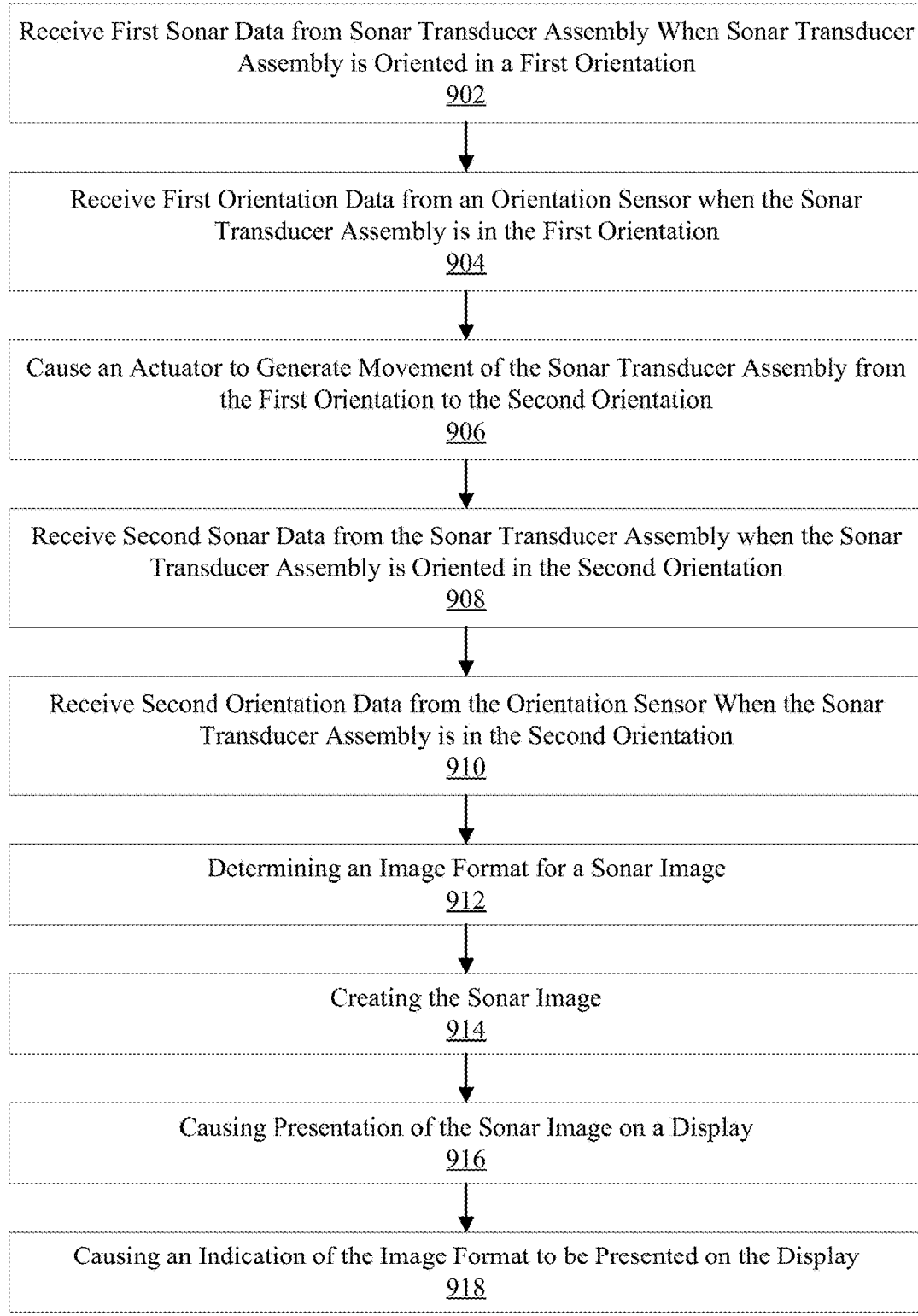

Having thus described the invention in general terms, reference will now be made to the accompanying drawings, which are not necessarily drawn to scale, and wherein:

FIG. 1A is a schematic view illustrating an example watercraft with a trolling motor assembly and sonar assemblies, in accordance with some embodiments discussed herein;

FIGS. 1B and 1C illustrate perspective views of example sonar systems attached to a watercraft with a transducer assembly positioned in different orientations, in accordance with some embodiments discussed herein;

FIGS. 2A-2B illustrate movement of a sonar transducer assembly from a first orientation to a second orientation in different ways, in accordance with some embodiments discussed herein;

FIGS. 2C-2D illustrate sonar beams being oriented in different directions to obtain an increased coverage volume, in accordance with some embodiments discussed herein;

FIGS. 3A-3B illustrate different approaches for mapping sonar data to an example sonar image, in accordance with some embodiments discussed herein;

FIGS. 4A-4B illustrate example displays presenting sonar images that have been formed by sweeping a sonar transducer along a circular arc, in accordance with some embodiments discussed herein;

FIG. 4C illustrates a sonar transducer assembly on a watercraft, with the sonar transducer assembly being adjusted from a first configuration to a second configuration and then to a third configuration, with different sonar coverage volumes being accomplished as a result, in accordance with some embodiments discussed herein;

FIG. 4D-4F illustrate an example display having a sonar image presented thereon, with indications being presented when a user hovers over or otherwise selects an image portion within the sonar image to indicate the configuration for a sonar transducer assembly when the sonar transducer assembly obtained sonar data corresponding to the image portion, in accordance with some embodiments discussed herein;

FIG. 5A illustrates an example sonar system in accordance with some embodiments discussed herein;

FIG. 5B illustrates an example first attachment, in accordance with some embodiments discussed herein;

FIG. 5C illustrates an example second attachment, in accordance with some embodiments discussed herein;

FIGS. 5D-5E illustrate perspective views of the example first attachment shown in FIG. 5B, in accordance with some embodiments discussed herein;

FIGS. 5F-5G illustrate cross-sectional views of the example first attachment shown in FIG. 5B, in accordance with some embodiments discussed herein;

FIG. 5H illustrates a perspective view of the example first attachment shown in FIG. 5B, in accordance with some embodiments discussed herein;

FIG. 6A illustrates a perspective view of an example aiming and orienting device in a first position, in accordance with some embodiments discussed herein;

FIG. 6B illustrates a perspective view of the example orientation device shown in FIG. 6A in a second position, in accordance with some embodiments discussed herein;

FIG. 6C illustrates a perspective view of the example orientation device shown in FIGS. 6A-6B in a third position, in accordance with some embodiments discussed herein;

FIGS. 7A-7F illustrate perspective views of the rotation of the first attachment, shown in FIG. 6A and the second attachment, shown in FIG. 6B, in accordance with some embodiments discussed herein;

FIG. 8 is a block diagram illustrating an example marine network architecture for various systems, apparatuses, and methods, in accordance with some embodiments discussed herein; and FIG. 9 is a flow chart illustrating an example method for forming a sonar image from a sonar transducer assembly, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. With the exception of the reference numerals used in FIG. 9, like reference numerals generally refer to like elements throughout. For example, reference numbers 100, 100A, 200A, and 200B are each used to represent a watercraft. Additionally, any connections or attachments may be direct or indirect connections or attachments unless specifically noted otherwise.

FIG. 1A illustrates an example watercraft 100 including various marine devices, in accordance with some embodiments discussed herein. As depicted in FIG. 1A, the watercraft 100 (e.g., a vessel) is configured to traverse a marine environment, e.g. body of water 101, and may use one or more sonar transducer assemblies 102A, 102B, and 102C disposed on and/or proximate to the watercraft. Notably, example watercraft contemplated herein may be surface watercraft, submersible watercraft, or any other implementation known to those skilled in the art. The sonar transducer assemblies 102A, 102B, and 102C may each include one or more transducer elements (such as in the form of the example assemblies described herein) configured to transmit sound waves into a body of water, receive sonar returns from the body of water, and convert the sonar returns into sonar return data. Various types of sonar transducers may be provided—for example, a linear downscan sonar transducer, a conical downscan sonar transducer, a sonar transducer array, or a sidescan sonar transducer may be used. Each of the sonar transducer assemblies 102A, 102B, 102C are configured to provide sonar data that may be stored and that may undergo further processing to form sonar images. The sonar data may include information representative of an underwater environment around a watercraft.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more sonar transducer assemblies (e.g., 102A, 102B, and/or 102C) may be mounted in various positions and to various portions of the watercraft 100 and/or equipment associated with the watercraft 100. For example, the transducer assembly may be mounted proximate to the transom 106 of the watercraft 100, such as depicted by sonar transducer assembly 102A. The transducer assembly may be mounted to the bottom or side of the hull 104 of the watercraft 100, such as depicted by sonar transducer assembly 102B. The transducer assembly may also be mounted to the trolling motor 108, such as depicted by sonar transducer assembly 102C.

The watercraft 100 may also include one or more marine electronic devices 199, such as may be utilized by a user to interact with, view, or otherwise control various aspects of the various sonar systems described herein. In the illustrated embodiment, the marine electronic device 199 is positioned proximate the helm (e.g., steering wheel) of the watercraft 100—although other locations on the watercraft 100 are contemplated. Likewise, additionally or alternatively, a remote device (such as a user's mobile device) may include functionality of a marine electronic device.

The watercraft 100 may also comprise other components within the one or more marine electronic devices 199 or at the helm. In FIG. 1A, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft 100 are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more marine electronic devices 199 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

The orientation device may be used in conjunction with a transducer assembly, such as to direct (aim and orient) generation of sonar images of an underwater environment. With reference to FIG. 1B, in some embodiments, the sonar system 103 may be attached to the side of a watercraft 100A and in electrical communication with a marine electronics device 199A on the watercraft 100A.

In some embodiments, the transducer assembly 160 may be configured to be oriented differently to provide different sonar image options. In an example embodiment, a user may selectively configure the transducer assembly 160 to be oriented vertically (such as downwardly from the watercraft with longest dimension of the emitting face 161 disposed in a vertical plane as illustrated in FIG. 1B) and provide a desirable sonar image that is wide (e.g., widest) in the vertical plane. This orientation is often referred to as being in the "forward", "down", or "normal" mode (e.g., depending on the facing direction and/or nomenclature). In this regard, the more narrow sonar beam coverage (e.g., about 20 degrees) may be used to see a more focused view in the port-to-starboard direction with respect to the watercraft. Conversely, in this orientation, the extended beam coverage (e.g., around 135 degrees) is now provided in the fore-and-aft direction with respect to the watercraft 100.

In another embodiment, the transducer assembly 160 may be configured to be oriented horizontally (e.g., with the longest dimension of the emitting face extending horizontally (such as pointing forward, to the side, or the back from the watercraft) as illustrated in FIG. 1C), and data from the transducer assembly 160 may be used to provide a desirable sonar image that is wide (e.g., widest) in the horizontal plane. This orientation may be referred to as being in "scout" mode. In this regard, the extended sonar beam coverage (e.g., about 135 degrees) may be used to see a wider view in the port-to-starboard direction with respect to the watercraft 100 (or off to one side of the watercraft or both sides if two transducer assemblies are used). Note, in the illustrated embodiment, broader coverage in the port-to-starboard direction results in more narrow coverage (e.g., about 20 degrees) in the fore-and-aft direction.

To expand coverage for sonar data obtained from a sonar transducer assembly, the sonar transducer assembly may be moved from a first position and/or a first orientation to a second position and/or a second orientation. Examples of this are illustrated in FIGS. 2A and 2B. In FIG. 2A, the sonar transducer assembly is attached to an arm, and the sonar transducer assembly and the arm pivot about a pivot point 284A. In FIG. 2A, a sonar transducer assembly 286A is illustrated in a first position and a first orientation, and the arm 288A is illustrated in a first position and a first orientation. Once rotated, the repositioned sonar transducer assembly 286A' is illustrated in a second position and in a second orientation, and the repositioned arm 288A' is illustrated in a second position and a second orientation. The sonar transducer assembly 286A may rotate about the pivot point 284A such that at least a portion of the sonar transducer assembly 286A moves in a sweeping motion along a circular arc. For example, as the sonar transducer assembly 286A moves, a point on the sonar transducer assembly 286A may shift from the first location 290A to the second location 290A', with this point moving in a sweeping motion along the circular arc 292A. The circular arc 292A extends only in the X-Y plane in FIG. 2A. However, in other embodiments, the circular arc generated by movement of the sonar transducer assembly 286A may still shift in a single plane, but this plane may be different. In other embodiments, the sonar transducer assembly 286A may shift in multiple planes.

In FIG. 2A, the sonar transducer assembly 286A is configured to generate multiple beams. For example, the sonar transducer assembly 286A may emit three or more different beams simultaneously. However, in other embodiments, sonar transducer assemblies may be used that emit only one beam at a time.

In FIG. 2B, a pivot point 284B is positioned on the sonar transducer assembly 286B, and the sonar transducer assembly 286B may be rotated about the pivot point 284B to be shifted to the new sonar transducer assembly position 286B'. The sonar transducer assembly 286B may rotate about the pivot point 284B such that at least a portion of the sonar transducer assembly 286B moves in a sweeping motion along a circular arc. For example, as the sonar transducer assembly 286B moves, a point on the sonar transducer assembly 286B may shift from the first location 290B to the second location 290B', with this point moving in a sweeping motion along the circular arc 292B. The circular arc 292B extends only in the X-Y plane in FIG. 2B. However, in other embodiments, the circular arc generated by movement of the sonar transducer assembly 286B may still shift in a single plane, but this plane may be different. In other embodiments, the sonar transducer assembly 286B may shift in multiple planes. In some embodiments, the orientation of the sonar transducer assembly may be changed at a constant rate as the sonar transducer assembly moves from a first location to a second location. However, in other embodiments, the orientation of the sonar transducer assembly may be changed at a variable rate as the sonar transducer assembly moves from a first location to a second location, and this may be beneficial where one wishes to obtain improved accuracy for a certain volume (e.g., in the forward direction of a watercraft, immediately below a watercraft, etc.). In some embodiments, sonar transducer assemblies may be moved only when a watercraft is stationary or when motors on the watercraft are not actively being used to generate thrust, and this may be beneficial to prevent damage to sonar transducer assemblies and other components used to attach the sonar transducer assemblies to the watercraft.

Shifting of the sonar transducer assembly may help form sonar images that have expanded coverage relative to other sonar images formed from a stationary sonar transducer assembly, and sonar transducer assemblies may be shifted in different ways to obtain sonar data with expanded coverage. For example, by rotating at least a portion of the sonar transducer assembly about a circular arc, with this circular arc being within a single horizontal plane, expanded beam coverage may be obtained in the forward direction of the watercraft as illustrated in FIG. 2C. In FIG. 2C, the watercraft 200A is represented. A first sonar beam 294A is included that illustrates the sonar coverage for a sonar transducer assembly when the sonar transducer assembly is maintained at a first position and/or a first orientation. The sonar transducer assembly may be moved from the first position and/or the first orientation to a second position and/or a second orientation. When the sonar transducer assembly is in this second position and/or orientation, a second sonar beam 295A may be generated. The sonar beams 294A, 295A illustrated in FIG. 2C are merely provided as examples, and it should be understood that the sonar transducer assembly may be moved in greater or lesser amounts, the sonar transducer assembly may be moved in different ways, etc. While only two sonar beams 294A, 295A are illustrated in FIG. 2C, sonar transducer assemblies may emit sonar signals at various times as the sonar transducer assemblies move to obtain more data.

FIG. 2D illustrates another example where at least a portion of a sonar transducer assembly is moved along a circular arc extending in a vertical plane, with expanded beam coverage being obtained for positions below a watercraft. In FIG. 2D, the watercraft 200B is represented. A first sonar beam 294B is included in FIG. 2D that illustrates the sonar coverage for a sonar transducer assembly when the sonar transducer assembly is maintained at a first position and/or a first orientation. The sonar transducer assembly may be moved from the first position and/or the first orientation to a second position and/or a second orientation. When the sonar transducer assembly is in this second position and/or orientation, a second sonar beam 295B may be generated. The sonar beams 294B, 295B illustrated in FIG. 2D are merely provided as examples, and it should be understood that the sonar transducer assembly may be moved in greater or lesser amounts, the sonar transducer assembly may be moved in different ways, etc. While only two sonar beams 294B, 295B are illustrated in FIG. 2D, sonar transducer assemblies may emit sonar signals at various times as the sonar transducer assemblies move to obtain more data.

In FIGS. 2C and 2D, regions 296A, 296B are present where there is an overlap in the sonar beams. The sonar data related to these regions 296A, 296B may be processed in different ways in different embodiments. In some embodiments, the sonar data from sonar beams emitted at later times may be used for the regions 296A, 296B, and sonar data from sonar beams emitted at earlier times may be disregarded for the regions 296A, 296B. For example, in FIG. 2C, the first sonar beam 294A may be emitted at a first time, the second sonar beam 295B may be emitted at a second time that is after the first time, and sonar data from the second sonar beam 295B may be used in the region 296A due to the fact that the second sonar beam 295B was emitted at a later time.

However, in other embodiments, sonar data from both sonar beams may be used in overlap regions. For example, in FIG. 2C, sonar data from the first sonar beam 294A and from the second sonar beam 295A may be used in the region 296A. In some embodiments, moving objects may be detected in overlap regions. For example, a fish or debris may be moving within the overlap region 296A, and this movement may be detected by analyzing sonar data from the first sonar beam 294A and from the second sonar beam 295A, where the second sonar beam 295A is emitted after the first sonar beam 294A. After identifying moving objects, processing techniques may be used to remove the moving objects from any sonar image that is generated, to emphasize the moving objects from any sonar image that is generated, etc. While the sonar beams 294A, 294B, 295A, 295B of FIGS. 2C and 2D are illustrated as spanning over certain angle ranges, these sonar beams may have larger or smaller sizes in other embodiments, and the shape of sonar beams 294A, 294B, 295A, 295B may be different in other embodiments.

Once sonar data is obtained from a sonar transducer assembly, the sonar data may be mapped to a sonar image using different approaches, and FIGS. 3A-3B illustrate different example approaches that may be taken for mapping sonar data to an example sonar image. Looking first at FIG. 3A, a display 340A is illustrated with a sonar image presented on a screen of the display 340A. A first image portion 361A on the screen may correlate to a sonar beam obtained when a sonar transducer assembly is in a first position (e.g., the first sonar beam 294A of FIG. 2C or the first sonar beam 294B of FIG. 2D), and the second image portion 363A on the screen may correlate to a sonar beam obtained when the same sonar transducer assembly is in a second position (e.g., the second sonar beam 295A of FIG. 2C or the second sonar beam 295B of FIG. 2D). The first image portion 361A and the second image portion 363A overlap in the overlap area 365A, and the overlap area 365A may correlate to the overlap regions 296A, 296B of FIGS. 2C and 2D respectively.

In FIG. 3B, the sonar data is mapped to a sonar image in a different manner relative to FIG. 3A. In FIG. 3B, a display 340B is illustrated with a sonar image presented on a screen of the display 340B. The sonar image may be created using sonar data when the sonar assembly is in a first configuration (e.g., with a given orientation and position), sonar data when the sonar assembly is in a second configuration, and data regarding the configurations that the sonar assembly is in or was previously in. The sonar image includes a first image portion 363A including image data representative of the first sonar data and a second image portion 363B including image data representative of the second sonar data. The second image portion 363B is partially different from the first image portion 363A, with the second image portion 363B overlapping with the first image portion 361A. The first image portion 363A is positioned relative to the second image portion 363B in a manner that correlates to the arc of the sweeping motion from the first orientation of the sonar transducer assembly to the second orientation of the sonar transducer assembly and portrays a real-world differential position of the first sonar data relative to the second sonar data within the sonar image.

A first image portion 361B on the screen may correlate to a sonar beam obtained when a sonar transducer assembly is in a first position (e.g., the first sonar beam 294A of FIG. 2C or the first sonar beam 294B of FIG. 2D), and the second image portion 363B on the screen may correlate to a sonar beam obtained when the same sonar transducer assembly is in a second position (e.g., the second sonar beam 295A of FIG. 2C or the second sonar beam 295B of FIG. 2D). The first image portion 361B and the second image portion 363B overlap in the overlap area 365B, and the overlap area 365B may correlate to the overlap regions 296A, 296B of FIGS. 2C and 2D respectively.

As illustrated in FIG. 3A, the second image portion 363A is partially offset from the first image portion 361A along a first direction D1. The first direction D1 extends within a horizontal direction in the sonar image of FIG. 3A. Furthermore, in FIG. 3B, the second image portion 363B is partially offset from the first image portion 361B along a second direction D2. The second direction D2 extends within a vertical direction in the sonar image of FIG. 3B. By mapping sonar data to the sonar image in this manner, the sonar images may be presented to a user in a manner that makes the sonar images easily understandable to the user. For example, as the user shifts looks from left to right in the sonar image represented in FIG. 3A or looks downwardly in the sonar image represented in FIG. 3B, the user may easily understand how positions on the sonar image correlate to actual locations relative to a watercraft. In other embodiments, the offset directions between a first image portion and a second image portion may be in a direction other than a horizontal direction or a vertical direction.

FIGS. 4A-4B illustrate other example displays having sonar images thereon with expanded beam coverage, with these sonar images being formed by sweeping a sonar transducer along a circular arc, with the circular arc extending in a vertical plane. Looking first at FIG. 4A, a display 440A is illustrated. This display 440A includes a screen where a sonar image 480A is displayed. This sonar image 480A may be formed by sweeping the sonar transducer assembly along a circular arc. In FIG. 4A, the first image portion 482A is illustrated, with this first image portion 482A being representative of the sonar data from the sonar transducer assembly when it is located in a first position. The first image portion 482A defines a coverage angle θ2, and this coverage angle θ2 may be less than the coverage angle θ1 for the sonar image 480A as a whole. As the sonar transducer assembly is moved, the sonar coverage may shift from the first image portion 482A to cover other image portions included in the sonar image 480A as indicated by the arrow.

In the sonar image 480A, representations of fish 497 are included. Furthermore, in the sonar image 480A, representations of the floor of the body of water 498A are also illustrated. Compared to other systems that form scanned sonar images as the watercraft moves, the sonar images formed through scanning techniques used in various embodiments herein may represent objects in the water in a more proportional amount regardless of position. For example, fish and the floor of the body of water may be represented more proportionally using scanning techniques described in various embodiments described herein. In the sonar image 480A, the sonar image includes indications of an orientation of the sonar transducer assembly, and these indications may assist in making the sonar image 480A easier for users to understand. For example, indications 413A are provided in the form of labels, with the labels containing specific orientation angles. These orientation angles may correspond to the specific angle that the sonar transducer assembly is positioned at for the sonar data proximate to the orientation angle. Additionally, indications 413B are provided in the form of lines. These lines extend only partially in FIG. 4A, but the lines may extend all the way to the top of the sonar image 480A in some embodiments.

The sonar image presented in the display 440A also includes one or more indications that illustrate an orientation of the first sonar data and the second sonar data utilized in the sonar image. These indications may be presented with respect to the watercraft, with respect to the surface of the body of water, or with respect to another point of reference. In the sonar image of FIG. 4A, a first indication 481A and a second indication 481B are illustrated. The first indication 481A illustrates the orientation of the obtained sonar data in a vertical plane, showing the orientation of sonar data corresponding to the first image portion 482A and showing the orientation of sonar data corresponding to another sonar coverage volume that the sonar transducer assembly is moving towards. The second indication 481B illustrates the orientation of the obtained sonar data in a horizontal plane, showing the orientation of sonar data corresponding to the first image portion 482A and showing the orientation of sonar data corresponding to another sonar coverage volume that the sonar transducer assembly is moving towards. The first indication 481A illustrates the orientation of sonar data relative to the watercraft and relative to the surface of the body of water, and the second indication 481B illustrates the orientation of sonar data relative to the watercraft. The indications 481A, 481B may enable the user to better understand the sonar data presented in the sonar image on the display 440A, giving the user a better understanding of where sonar data represented with a sonar image is relative to a watercraft or relative to the surface of the body of water.

Turning now to FIG. 4B, a display 440B is illustrated. This display 440B includes a screen where a sonar image 480B is displayed. This sonar image 480B may be formed by sweeping the sonar transducer assembly along a circular arc, with the circular arc extending within a horizontal plane. In FIG. 4B, the image portion 482B is illustrated, with this image portion 482B being representative of the sonar data from the sonar transducer assembly when it is located in a first position. The image portion 482B defines a coverage angle θ4, and this coverage angle θ4 may be less than the coverage angle θ3 for the sonar image 480B as a whole. As the sonar transducer assembly is moved, the sonar coverage may shift from the image portion 482B to cover other image portions included in the sonar image 480B as indicated by the arrow.

The sonar image 480B includes indications 413C of an orientation of the sonar transducer assembly, and these indications 413C may assist in making the sonar image 480B easier for a user to understand. Indications 413C are provided in the form of labels, with the labels containing specific orientation angles. These orientation angles may correspond to the specific angle that the sonar transducer assembly is positioned at for the sonar data proximate to the orientation angle. In the sonar image 480B, representations of the floor of the body of water 498B are illustrated.

Similar to the sonar image presented in the display 440A of FIG. 4A, the sonar image presented in the display 440B of FIG. 4B includes an indication 481C and an indication 481D. The indication 481C illustrates the orientation of the obtained sonar data in a horizontal plane in a top view, showing the orientation of sonar data corresponding to the image portion 482B and showing an arrow for the direction that the sonar transducer assembly is moving in. The indication 481C illustrates the orientation of sonar data relative to the watercraft. The indication 481D illustrates the orientation of the obtained sonar data in a vertical plane in a side view, with the indication 481D illustrating the orientation of the obtained sonar data relative to the watercraft and relative to the surface of the body of water. The indications 481C, 481D may enable the user to have a better understanding of where sonar data represented in a sonar image was obtained relative to a watercraft. Other indications may be provided in the sonar image to provide further guidance to the user, and the indications 481A-481D are merely exemplary.

Turning now to FIG. 4C, different image portions for a sonar transducer assembly 402 on a watercraft 400 are illustrated. The sonar transducer assembly 402 may be part of the sonar systems (e.g., sonar system 503 of FIG. 5A) described herein in some embodiments. The sonar transducer assembly 402 may have a first coverage volume 477A when the sonar transducer assembly 402 is in a first configuration, the sonar transducer assembly 402 may have a second coverage volume 477B when the sonar transducer assembly 402 is in a second configuration, and the sonar transducer assembly 402 may have a third coverage volume 477C when the sonar transducer assembly 402 is in a third configuration. In adjusting the sonar transducer assembly 402 so that it moves from the first configuration to the second configuration, the coverage may generally move along the first path 483A. Additionally, in adjusting the sonar transducer assembly 402 so that it moves from the second configuration to the third configuration, the coverage may generally move along the second path 483B. In the example illustrated in FIG. 4C, the coverage volumes 477A, 477B, 477C are not simply shifted in a one-dimensional direction, with the paths 483A, 483B being straight lines or circularly curved arcs. Instead, the coverage volumes 477A, 477B, 477C are moved in multiple directions, with the paths 483A, 483B having complex movement with inflection points and with the coverage volumes 477A-477C being rotated relative to each other. However, as discussed herein, the movement of sonar systems having sonar transducer assemblies therein may take a variety of different forms, and sonar systems may move in simpler ways in other embodiments.

Despite the complex movement that may occur using sonar systems described herein, sonar data may still be mapped in a manner that is easily understandable to users. FIGS. 4D-4F each illustrate an example display 440C presenting a downscan sonar image. Within the downscan sonar image, different image portions of sonar data are presented, including a first image portion 445A, a second image portion 445B, and a third image portion 445C. Lines between image portions may be visible in some embodiments, but these lines may be hidden in other embodiments. Despite the complex movement that may occur with sonar systems, data from the sonar systems may be mapped on an easy-to-understand downscan sonar image and this image may be presented on a display. However, the data may be mapped to other types of sonar images as discussed herein.

Indications may be provided on the screen of the display 440C to allow the user to understand the configuration that the sonar system was in when the sonar data within an image portion was obtained. The sonar image presented on the display may be created using sonar data from the sonar transducer assembly when the sonar transducer assembly is in a first configuration, with this sonar data providing data regarding a first underwater volume. The sonar image presented on the display may be created using sonar data from the sonar transducer assembly when the sonar transducer assembly is in a second configuration, with this sonar data providing data regarding a second underwater volume. In the first configuration and the second configuration, the sonar transducer assembly may be positioned and oriented in a particular manner. Data regarding the position and/or orientation of the sonar transducer assembly or corresponding sonar systems may also be considered in forming the sonar image.

The sonar image includes a first image portion 445A including image data representative of the first sonar data, a second image portion 445B including image data representative of the second sonar data, and a third image portion 445C including image data representative of the third sonar data. The image portions 445A-445C are each different from each other. The first image portion 445A is positioned relative to the second image portion 445B in a manner that correlates to the arc of the sweeping motion from the first orientation of the sonar transducer assembly to the second orientation of the sonar transducer assembly so as to portray a real-world differential position of the first sonar data relative to the second sonar data within the sonar image. For example, in FIGS. 4D-4F, the second image portion 445B is positioned to the right of the first image portion 445A. The third image portion 445C may also be positioned in a similar manner relative to the second image portion 445B.

Turning now to FIG. 4D, indications 491A', 491B', 491C' are illustrated, with these indications being presented when a user hovers over or otherwise selects the first image portion 445A. The indication 491A' presents a side view of the watercraft and illustrates that the sonar coverage volume is slightly rotated towards the stern of the watercraft. The indication 491B' illustrates a top view of the watercraft and illustrates that the sonar coverage volume is positioned proximate to the stern of the watercraft. The indication 491C' illustrates a rear view of the watercraft and illustrates that the sonar coverage volume is generally oriented in the downward direction. The first image portion 445A may be formed using data from the coverage volume 477A of FIG. 4C, but the first image portion 445A may be obtained using other data in other embodiments.

In FIG. 4E, indications 491D', 491E', 491F' are illustrated, with these indications being presented when a user hovers over or otherwise selects the first image portion 445B. The indication 491D' presents a side view of the watercraft and illustrates that the sonar coverage volume is slightly rotated towards the stern of the watercraft. The indication 491E' illustrates a top view of the watercraft and illustrates that the sonar coverage volume is positioned proximate to the center of the watercraft with the sonar coverage volume being rotated slightly in a clockwise direction. The indication 491F' illustrates a rear view of the watercraft and illustrates that the sonar coverage volume is slightly rotated towards the port direction of the watercraft. The second image portion 445B may be formed using data from the sonar coverage volume 477B of FIG. 4C, but the second image portion 445B may be obtained using other data in other embodiments.

Looking now at FIG. 4F, indications 491G', 491H', 491I' are illustrated, with these indications being presented when a user hovers over or otherwise selects the first image portion 445C. The indication 491G' presents a side view of the watercraft and illustrates that the sonar coverage volume is slightly rotated towards the bow of the watercraft. The indication 491H' illustrates a top view of the watercraft and illustrates that the sonar coverage volume is positioned in front of the watercraft, with the sonar coverage volume being rotated in a clockwise direction. The indication 491I' illustrates a rear view of the watercraft and illustrates that the sonar coverage volume is slightly rotated towards the starboard direction of the watercraft. The third image portion 445C may be formed using data from the sonar coverage volume 477C of FIG. 4C, but the third image portion 445C may be obtained using other data in other embodiments.

FIGS. 5A-5H illustrate a sonar system 503 having an orientation device 540 for use with a transducer assembly 560, according to some example embodiments. In some embodiments, the sonar system 503 may be used to turn a sonar transducer assembly to any orientation below a horizontal plane. For example, the sonar transducer assembly 560 may be rotated 180 degrees from a forward direction to a rearward direction, the sonar transducer assembly 560 may be rotated 180 degrees from a port direction to a starboard direction, or the sonar transducer assembly 560 may be rotated to other positions so that the sonar transducer assembly 560 points into a body of water.

Similar to the orientation device 640, the orientation device 540 may include a shaft 550 (shown as transparent) defining a top end 550A and a bottom end 550B, wherein the shaft 550 defines a shaft axis 590 extending between the top end 550A and the bottom end 550B. In some embodiments, the shaft 550 may surround a rod 532 having a top rod end 532A and a bottom rod end 532B extending within the shaft 550. In some embodiments, the orientation device 540 may include an attachment device 570 affixed to the shaft 550. The orientation device 540 may be fixed, for example, to either a side, bow, or stern of a watercraft via the attachment device 570, which may be, for example, an adjustable clamp. As shown, in some embodiments, the shaft 550 may be hollow to retain the rod 532 and other features of the orientation device 540 and allow the rod 532 to rotate therein, such as about the axis 590.

In some embodiments, the orientation device 540 may include a first attachment 521 and a second attachment 511 pivotably connected at the top end 550A of the shaft 550 and the bottom end 550B of the shaft 550, respectively. Each of the first attachment 521 and the second attachment 511 may include similar components and may engage in reciprocal motion. In some embodiments, the second attachment 511 may secure the transducer assembly 560 to the shaft 550, while the first attachment 521 may secure steering means or means of moving the second attachment 511.

FIG. 5B illustrates a perspective view of the first attachment 521 of the orientation device. In some embodiments, the first attachment 521 defines a first member 522 (FIG. 5E) pivotably connected at the top end 550A of the shaft 550. The first member 522 may be pivotably attached about a first axis $A_1$. In some embodiments, the first axis $A_1$ is perpendicular to the shaft axis 590. In some embodiments, the first member 522 defines a head 522A and a neck 522B. In some embodiments, the first member 522 extends from the first axis $A_1$ along a first rotation axis $A_{R1}$. In some embodiments, the first member 522 may be operatively connected to a top end of the rod 532A.

In some embodiments, the first attachment 521 further comprises a handle member 526 (see FIG. 5E) defining a handle member body 526A. The handle member body 526A may envelop the neck 522B of the first member 522 about the first rotation axis $A_{R1}$. In some embodiments, the handle member body 526A may define a first guide path 527 extending along the handle member body 526A. In some embodiments, a first arm 525 may secure the handle member body 526A to the first member 522 by extending through the first guide path 527 of the handle member body 526A. In some embodiments, the first arm 525 may be pivotable about a first dowel axis $A_{D1}$ (e.g., up and down in FIG. 5E), wherein the first dowel axis $A_{D1}$ is perpendicular to the first rotation axis $A_{R1}$. In some embodiments, rotation of the handle member body 526A about the first rotation axis $A_{R1}$ may cause the first arm 525 to pivot about the first dowel axis $A_{D1}$ due to interaction between the first guide path 527 and the first arm 525.

FIG. 5C illustrates a perspective view of the second attachment 511 of the orientation device 540. In some embodiments, the components of the second attachment 511 are substantially reciprocal to the components of the first attachment 521.

In some embodiments, the second attachment 511 comprises a second member 512 pivotably connected to the bottom end 550B of the shaft 550. The second member 512 may be pivotably attached about a second axis $A_2$. In some embodiments, the second axis $A_2$ is parallel to the first axis $A_1$, and perpendicular to the shaft axis 590. In some embodiments, the second member 512 defines a head 512A and a neck 512B. In some embodiments, the second member 512 extends from the second axis $A_2$ along a second rotation axis $A_{R2}$. In some embodiments, the second member 512 may be operatively connected to a bottom end of the rod 532B.

In some embodiments, the second attachment 511 further comprises a bracket member 516 defining a mounting portion 516B and a bracket member body 516A. The bracket member body 516A may envelop the neck 512B of the second member 512 about the second rotation axis $A_{R2}$. In some embodiments, the bracket member body 516A may define a second guide path 517 extending along the bracket member body 516A. In some embodiments, a second arm 515 may secure the bracket member body 516A to the second member 512 by extending through the second guide path 517 of the bracket member body 516A. In some embodiments, the second arm 515 may be pivotable about a second dowel axis $A_{D2}$, wherein the second dowel axis $A_{D2}$ is perpendicular to the second rotation axis $A_{R2}$. In some embodiments, the pivoting action of the second arm 515 about the second dowel axis $A_{D2}$ causes rotation of the bracket member 516 about the second rotation axis $A_{R2}$ as the second arm 515 causes the bracket member body 516A to rotate by interaction between the second guide path 517 and the second arm 515.

In some embodiments, the orientation device 540 comprises a first connector 558 extending between the first member 522 and the second member 512. In some embodiments, the first connector 558 rotationally connects the first member 522 and the second member 512. In illustrated embodiment, the first connector 558 is secured about the head 522A of the first member 522 and the head 512A of the second member 512. Accordingly, the first connector 558 is configured such that rotation of the handle member 526 and the first member 522 about the first axis $A_1$ causes corresponding rotation of the second member 512 and the bracket member 516 about the second axis $A_2$. In some embodiments, the first connector 558 may be a flexible connector including a strap, a band, a wire, or similar structure.

In some embodiments, at least one second connector 559 is secured between the first arm 525 and the second arm 515. In some embodiments, the second connector 559 is configured such that movement of the first arm 525 is connected to movement of the second arm 515 such that pivoting the first arm 525 about the first dowel axis $A_{D1}$ causes corresponding pivoting of the second arm 515 about the second dowel axis $A_{D2}$. In some embodiments, the corresponding movement of the first arm 525 and the second arm 515 causes rotation of the bracket member 516 about the second rotation axis $A_{R2}$. In some embodiments, the at least one second connector is two second connectors, wherein each of the two second connectors 559 are attached to corresponding sides of the first arm 525 and the second arm 515 such that the first arm 525 and the second arm 515 are parallel. In some embodiments, the second connector 559 may be a strap, a band, a wire, or similar structure.

In some embodiments, a transducer assembly 560 may be secured to the mounting portion 516B of the bracket member 516. In some embodiments, the transducer assembly 560 may comprise a plurality of sonar transducer arrays 564. In some embodiments, each of the plurality of sonar transducer arrays 564 may be aligned in differing directions.

In some embodiments, the transducer assembly 560 may be aimed and oriented through rotation of the handle member 526. In this regard, rotation of the handle member 526 about the first axis $A_1$ may cause corresponding rotation of the transducer assembly 560 about the second axis $A_2$. Likewise, rotation of the handle member 526 about the first rotation axis $A_{R1}$ may cause corresponding rotation of the transducer assembly 560 about the second rotation axis $A_{R2}$.

FIGS. 5D-5H illustrate different perspective views orientations of the first attachment 521. As described above, the second attachment 511 comprises similar reciprocal components.

FIG. 5D illustrates a side view of the first attachment 521. In the illustrated embodiment, the first member 522 is secured to the rod 532 between a set of prongs 541. The set of prongs 541 may be formed as flat surfaces extending from the rod 532. In some embodiments, the prongs 541 may be wider than a width of the first member 522. In some embodiments, the head 522A of the first member 522 may be positioned between the prongs 541. The head 522A may be circular in shape and may be connected to the prongs 541 via a pin 537 disposed in a pin opening 522C in the radial center of the head 522A (see, e.g., FIG. 5E). In some embodiments, the head 522A may define a radius, wherein the radius is smaller than the length of the prongs 541 to enable pivoting of the head 522A, as described herein. In this regard, the head 522A may be able to pivot about the first axis $A_1$ between the prongs 541.

In some embodiments, the rod 532 may define alignment protrusions 539 disposed on each prong 541. In some embodiments, the alignment protrusions 539 may be configured to retain and align the second connector (see, e.g., 559A, 559B of FIG. 5H).

FIG. 5E illustrates a side view of the first attachment 521. The head 522A of the first member 522 includes a pin opening 522C, which aligns with a prong opening 541A to receive a pin to allow the head 522A to pivot about the first axis $A_1$.

In some embodiments, the first arm 525 is configured to pivot about the first dowel axis $A_{D1}$. The first dowel axis $A_{D1}$ may extend perpendicular to the first axis $A_1$. In some embodiments, the first arm 525 is configured to pivot about the first dowel axis $A_{D1}$, as the first arm 525 pivots, the first arm 525 engages with the handle member body 526A via the first guide path 527. The first arm 525 defining a single degree of freedom about the first dowel axis $A_{D1}$ causes the handle member body 526A to rotate about the first rotation axis $A_{R1}$, as shown in FIGS. 7A-7F.

The handle member body 526A is configured to rotate about the first rotation axis $A_{R1}$, as illustrated in FIG. 5F. The first rotation axis $A_{R1}$ extends from the head 522A through the neck 522B of the first member 522. The first rotation axis $A_{R1}$ is perpendicular to the first dowel axis $A_{D1}$, and the first axis $A_1$.

In some embodiments, the first arm 525 may be positioned within an opening in the neck 522B of the first member 522 and secured with a first dowel 523. The first dowel 523 may be sized such that the first dowel 523 secures the first arm 525 within the neck 522B while being sized such that the first dowel 523 does not contact the handle member body 526A of the handle member 526. In some embodiments, the first dowel 523 may contact the handle member body 526A of the handle member 526, however, the first dowel 523 does not hinder the rotation of the handle member 526.

FIG. 5G illustrates the axes of motion of the first attachment 521. The shaft axis 590, the first axis $A_1$ and the first rotation axis $A_{R1}$ intersect, whereas the first dowel axis $A_{D1}$ only intersects with the first rotation axis $A_{R1}$. Thus, the movement of the first arm 525 about the first dowel axis $A_{D1}$ is independent of the movement of the first member 522 about the first axis $A_1$. However, the combination of the rotation about the first rotation axis $A_{R1}$ from the handle member 526, which causes the first arm 525 to pivot about the first dowel axis $A_{D1}$, and the first member 522 pivoting about the first axis $A_1$ allows the first attachment 521 to maneuver such as to aim the second attachment 512 into any direction, yielding universal orientation.

The first attachment 521 and the second attachment 511 are reciprocally moveable, that any movement of the first attachment 521 is translated to the second attachment 512. In some embodiments, the reciprocal movement is generated via the first connector 558 and the second connector 559.

As illustrated in FIG. 5H, the first arm 525 may define a first side 525A and a second side 525B. The first side 525A may include a first connection point 524A, and the second side 525B may include a second connection point 524B. Each of the first connection point 524A and the second connection point 524B may be formed as a through hole configured to receive a nut or other securing means to retain the corresponding second connector 559A, 559B. In some embodiments, the first connection point 524A and the second connection point 524B may be formed as snaps within the arm 525 wherein the snap is configured to retain the corresponding second connector 559A, 559B such that the second connector 559A, 559B is not moveable through the first arm 525.

In some embodiments, the second connector 559 may be configured as a first flexible link 559A and a second flexible link 559B. In some embodiments, the first side 525A of the first arm 525 may retain the first flexible link 559A, and the second side 525B of the first arm 525 may retain the second flexible link 559B. In some embodiments, the first flexible link 559A may extend from the first side 525A of the first arm 525 to a first side of a second arm 515 of the second attachment 511 (see, e.g., FIG. 5A). The first flexible link 559A may extend from the first side 525A through the alignment protrusions 539, wherein the alignment protrusion 539 retain the orientation of the first flexible link 559A to prevent twisting. In some embodiments, the alignment protrusions 539 may further provide tension to the first flexible link 559A.

Similarly, in some embodiments, the second flexible link 559B may extend from the second side 525B of the first arm 525 to a second side of the second arm 515 of the second attachment 511 (see, e.g., FIG. 5A). The second flexible link 559B may extend from the second side 525A through the alignment protrusions 539, wherein the alignment protrusion 539 retain the orientation of the second flexible link 559B to prevent twisting. In some embodiments, the alignment protrusions 539 may further provide tension to the second flexible link 559B.

In some embodiments, the rod 532 may include a pair of alignment protrusions 539 secured to each side of the prongs 541 on the top side 532 and on the bottom side 532B of the rod 532. In some embodiments, the pairs of alignment protrusions 539 may provide tension to the second connectors 559 and may prevent the first flexible link 559A and second flexible link 559B from twisting, thereby extending the life the orientation device 540.

In some embodiments, the first flexible link 559A and the second flexible link 559B may be positioned such that a width of the second connector 559 extends in the direction of the first axis $A_1$. Thus, the width of the second connector 559 is secured within the first arm 525. In some embodiments, the alignment protrusions 539 define a height, wherein the height is greater than the width of the second connector 559. In some embodiments, the width of the second connector 559 is greater than the height of the alignment protrusions 539.

The first connector 558 may extend between the first member 522 and the second member 512. The first connector 558 may be formed as a loop wherein a portion of the loop engages with the first member 522 and a portion engages with the second member 512. In some embodiments, the first connector 558 includes an opening for each of the first member 522 and the second member 512. In some embodiments, the first connector 558 is formed from a resilient material such that a first opening for receiving the first member 522 and a second opening for receiving the second member 512 will not lead to tears, or breakage adjacent the openings.

In some embodiments, the first connector 558 may have at least one tooth, and the first member 522 may have at least one groove configured to receive the at least one tooth. In some embodiments, the at least one tooth may be a plurality of teeth, and the second member 512 may have at least one groove, configured to receive one of the plurality of teeth to retain the first connector about the first member 522 and the second member 512. In other embodiments, the first connector 558 may have one or more holes and the first member 522 (and second member 512) may have one or more teeth that fit therein to enable the reciprocal rotation between the first member 522 and the second member 512 (e.g., through the first connector 558).

In some embodiments, the first connector 558 may be two distinct first connectors attached about the head 522A on either side of the neck 522B of the first member 522. In such embodiments, the rod 532 may include a slack retention gear formed as a latch to sinch excess slack within the first connector 558 as the first member 522 and second member 512 pivot about the first axis $A_1$ and second axis $A_2$ respectively.

In some embodiments, the first connector 558 extends along one face of the rod 532 while the first flexible link 559A and the second flexible link 559B extend along opposite sides of the rod 532.

As described above, the first attachment 521 and the second attachment 511 engage in reciprocal movement. FIGS. 6A-6C illustrate the components of aiming an orientation device 640 used to pivot a first member 622 and a second member 612 about the first axis $A_1$ and a second axis $A_2$ respectively. FIG. 6A illustrates the first member 622 and the second member 612 of the orientation device 640 in a first position. The first member 622 defines a first rotation axis $A_{R1}$ and the second member 612 defines a second rotation axis $A_{R2}$. In the first position, each of the first rotation axis $A_{R1}$ and the second rotation axis $A_{R2}$ intersect the shaft axis 690 at a first intersection angle $\alpha 1$, wherein the first intersection angle $\alpha 1$ is equivalent as formed between the first rotation axis $A_{R1}$ and the shaft axis 690 and the second rotation axis $A_{R2}$ and the shaft axis 690.

A first connector 658 may extend between the first member 622 and the second member 612. In some embodiments, the first connector 658 is secured between the first member 622 and the second member 612 such that the rotation of the first member 622 causes corresponding rotation of the second member 612. For example, as an intersection angle $\alpha 1$ increases due to counterclockwise rotation of the first member 612, the first connector 658 and the second member 612 correspondingly rotate counterclockwise to maintain the same intersection angle $\alpha 1$ between the second member 612 and the shaft 650.

In some embodiments, the first connector 658 has a constant length. In some embodiments, a portion of the first connector 658 is in contact with the first member 622 and the second member 612. As the first member 622 and second member 612 rotate, the portion of the first connector 658 in contact with the first member 622 and second member 612 changes. In some embodiments, the portion of the first connector 658 in contact with the first member 622 and the second member 612 is constant but shifts between sides of the first rotation axis $A_{R1}$ and the second rotation axis $A_{R2}$ of the first member 622 and the second member 612. For example, as illustrated in FIG. 6A, as relative to a head portion of the first member 622 and a head portion of the second member 612, there may be a greater portion of the first connector 658 on the side of the first rotation axis $A_{R1}$ and second rotation axis $A_{R2}$ Opposite the intersection angle $\alpha 1$, while there may be a smaller portion of the first connector 658 on the side of the first rotation axis $A_{R1}$ and second rotation axis $A_{R2}$ defining the intersection angle $\alpha 1$.

FIG. 6B illustrates the components of the orientation device 640 in a second position. The first member 622 is rotated counterclockwise such that the first rotation axis $A_{R1}$ is in line with the shaft axis 690. Since the first member 622 and the second member 612 exhibit reciprocal movements, the second member 612 is similarly shifted such that the second rotation axis $A_{R2}$ is in line with the shaft axis 690. Each of the first member 622 and the second member 612 define an equal second intersection angle $\alpha 2$.

In the second position, the first member 622 and the second member 612 may be aligned with the shaft 650. Thus, the first connector 658 may be evenly distributed related to the head portion on either side of the first rotation axis $A_{R1}$ and the second rotation axis $A_{R2}$.

FIG. 6C illustrates the components of the orientation device 640 in a third position. The first member 622 and the second member 612 are rotated counterclockwise from the second position shown in FIG. 6B. In the third position, the first rotation axis $A_{R1}$ and the second rotation axis $A_{R2}$ form a third intersection angle $\alpha 3$ with the shaft axis 690. In the third position, a greater portion of the first connector 658 is on the side of the first rotation axis $A_{R1}$ and second rotation axis $A_{R2}$ defining the third intersection angle $\alpha 3$, while a smaller portion of the first connector 658 is on the side of the first rotation axis $A_{R1}$ and second rotation axis $A_{R2}$ opposite the third intersection angle 3. Thus, as illustrated in FIGS. 6A-6C, the first connector 658 is configured to drive the reciprocal movement of the first member 622 and the second member 612 pivoting about the shaft axis 690.

Similar to the reciprocal movement between the first member and the second member driven by the first connector, the handle member and the bracket member exhibit reciprocal rotation about the first rotation axis $A_{R1}$ and the second rotation axis $A_{R2}$ respectively, driven in part by the second connector.

FIGS. 7A-7F illustrate the reciprocal rotation of the handle member driving the pivoting action of the first arm, which drives the corresponding pivoting of the second arm (through the second connector) and corresponding rotation of the bracket member.

FIG. 7A illustrates a first attachment 721 in a first position, and FIG. 7B illustrates a second attachment 711 in the first position. The first attachment 721 defines a first member 722 and a handle member 726. The handle member 726 may define a handle member body 726A and a handle 726B extending therefrom. The handle member body 726A of the handle member 726 may be secured to the first member 722 by a first arm 725. In some embodiments, the second connector may define a first flexible link 759A and a second flexible link 759B. The first arm 725 may secure the first flexible link 759A on one side of the first arm and the second flexible link 759B on the opposing side of the first arm. In some embodiments, the first arm 725 may be configured to pivot about a first dowel axis $A_{D1}$.

Similarly, FIG. 7B illustrates a second attachment 711 in a first position. The second attachment 711 defines a second member 712, and a bracket member 716. The bracket member 716 may define a bracket member body 716A and a mounting portion 716B extending therefrom. The bracket member body 716A of the bracket member 716 may be secured to the second member 712 by a second arm 715. The second arm 715 may secure the first flexible link 759A on one side and may secure the second flexible link 759B on the opposing side. The second arm 715 may be configured to pivot about a second axis $A_{D2}$.

FIGS. 7A-7B illustrate corresponding attachments 711, 721 of an orientation device for use, for example, with a sonar system. Each of the first attachment 721 and the second attachment 711 are attached to a first side 750A of a shaft and a second side 750B of a shaft, respectively. Rotation of the handle member 726 about a first rotation axis $A_{R1}$ causes the handle member body 726A including a first guide path 727 to rotate. The rotation of the handle member body 726A causes the first arm 725 to pivot about the first dowel axis $A_M$ due to interaction between the first guide path 727 and the first arm 725. Similarly, pivoting of the second arm 715 induces rotation of the bracket member 716 about a second rotation axis $A_{R2}$ due to the interaction between a second guide path 717 formed in the bracket member body 716A and the second arm 715. Thus, the first arm 725 and the second arm 715 remain in a parallel orientation as the handle member 726 and the bracket member 716 rotate.

In some embodiments, the second connector 759 secured between the first arm 725 and the second arm 715 drives the reciprocal pivoting movement of the second arm 715 as the first arm 725 is pivoted. The first flexible link 759A and the second flexible link 759B of the second connector 759 may be the same length. In some embodiments, the first flexible link 759A may be attached between a first side of the first arm 725A and a first side of the second arm 715A, while the second flexible link 759B may be attached between a second side of the first arm 725B and a second side of the second arm 715B. Thus, as the first arm 725 pivots one of the first flexible link 759A or the second flexible link 759B will pull the second arm 715 so as to maintain a parallel configuration with the first arm 725.

As illustrated in FIG. 7A-7B, the first attachment 721 and the second attachment 711 are in a first position. In the first position the first side of the first arm 725A and the first side of the second arm 715A are tilted towards the handle member 726, while the second side of the first arm 725B and the second side of the second arm 715B are tilted towards the bracket member 716.

Figures 7C, 7D:
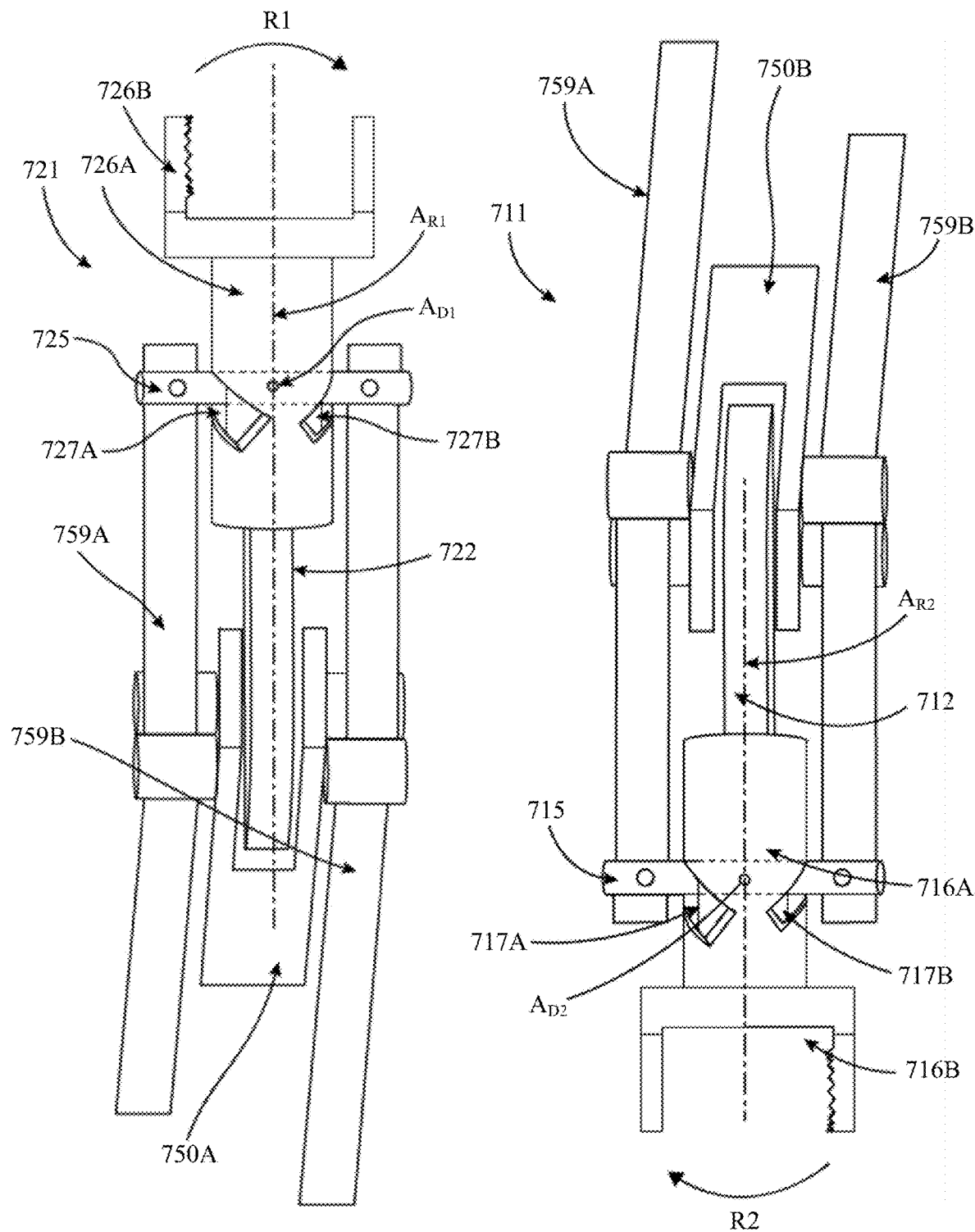

FIGS. 7C-7D illustrate various components of the orientation device in a second position. The handle member 726 and the bracket member 716 have rotated clockwise from the first position shown in FIGS. 7A-7B respectively.

The transition from the first position shown in FIGS. 7A-7B, to the second position shown in FIGS. 7C-7D comprises a series of cascading movements within the orientation device. First, the handle 726B of the handle member 726 is rotated clockwise about the first rotation axis $A_{R1}$ (e.g., via a user's hand, a motor, etc.), causing the handle member body 726A to rotate. Thus, the first guide path 727 rotates with the handle member body 726A—inducing the first arm 725 to pivot about the first dowel axis $A_{D1}$ within the first guide path 727. Due to the counterclockwise pivot of the first arm 725, the second flexible link 759B induces movement of the second arm 715. Thus, the second arm 715 pivots counterclockwise about the second dowel axis $A_{D2}$, within the second guide path 717—inducing the bracket member body 716A to rotate about the second rotation axis $A_{R2}$. As the bracket member body 716A rotates, the mounting portion 716B correspondingly rotates to the second position as illustrated in FIGS. 7C-7D.

In some embodiments, the first guide path 727 may comprise a first path 727A and a second path 727B within the handle member body 726A. In some embodiments, the first path 727A and the second path 727B may be symmetrical about the first rotation axis $A_{R1}$ thus, allowing the first arm 725 to pivot about the first dowel axis $A_{D1}$. In some embodiments, the first path 727A and the second path 727B may extend partially diagonally about the handle member body 726A.

Similarly, in some embodiments, the second guide path 717 may comprise a third path 717A and a fourth path 717B within the bracket member body 716A. In some embodiments, the third path 717A and the fourth path 717B may be symmetrical about the second rotation axis $A_{R2}$, thus allowing the second arm 715 to pivot about the second dowel axis $A_{D2}$. In some embodiments, the third path 717A and the fourth path 717B may extend partially diagonally about the bracket member body 716A.

FIGS. 7E-7F illustrate the first attachment 721 and the second attachment 711 in a third position, wherein the handle member 726 and the bracket member 716 have rotated further clockwise from the first position and the second positions illustrated in FIGS. 7A-7D. As discussed above with reference to the movement between the first position and the second position, the handle member 726 and the bracket member 716 follow the same motion between the second position and the third position, and back between the third position, second position and the first position. Thus, the rotational movement created by the handle member 726 about the first rotation axis $A_{R1}$, and the rotational movement created by the first member 722 about the first axis $A_1$ allow for the bracket member to be aimed and oriented in any direction.

The watercraft may have systems thereon including various electrical components, and FIG. 8 is a block diagram illustrating electrical components that may be provided in one example system 807A. The system 807A may comprise numerous marine devices. As shown in FIG. 8, a sonar transducer assembly 862, a radar 856A, a rudder 857, a primary motor 805, a trolling motor 808, and additional sensors/devices 864 may be provided as marine devices, but other marine devices may also be provided. One or more marine devices may be implemented on the marine electronic device 899 as well. For example, a position sensor 845, a direction sensor 848, an autopilot 850, and other sensors/devices 852 may be provided within the marine electronic device 899. These marine devices may be integrated within the marine electronic device 899, integrated on a watercraft at another location and connected to the marine electronic device 899, and/or the marine devices may be implemented at a remote device 854 in some embodiments. The system 807A may include any number of different systems, modules, or components, each of which may comprise any device or means embodied in either hardware, software, or a combination of hardware and software configured to perform one or more corresponding functions described herein.

The marine electronic device 899 may include at least one processor 810, a memory 820, a communications interface 878, a user interface 835, a display 840, autopilot 850, and one or more sensors (e.g. position sensor 845, direction sensor 848, other sensors/devices 852). One or more of the components of the marine electronic device 899 may be located within a housing or could be separated into multiple different housings (e.g., be remotely located).

The processor(s) 810 may be any means configured to execute various programmed operations or instructions stored in a memory device (e.g., memory 820) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) 810 as described herein.

In an example embodiment, the memory 820 may include one or more non-transitory storage or memory devices such as, for example, volatile and/or non-volatile memory that may be either fixed or removable. The memory 820 may be configured to store instructions, computer program code, radar data, and additional data such as sonar data, chart data, location/position data in a non-transitory computer readable medium for use, such as by the processor(s) 810 for enabling the marine electronic device 899 to carry out various functions in accordance with example embodiments of the present invention. For example, the memory 820 could be configured to buffer input data for processing by the processor(s) 810. Additionally or alternatively, the memory 820 could be configured to store instructions for execution by the processor(s) 810. The memory 820 may include computer program code that is configured to, when executed, cause the processor(s) 810 to perform various methods described herein. The memory 820 may serve as a non-transitory computer readable medium having stored thereon software instructions that, when executed by a processor, cause methods described herein to be performed.

The communications interface 878 may be configured to enable communication to external systems (e.g. an external network 802). In this manner, the marine electronic device 899 may retrieve stored data from a remote device 854 via the external network 802 in addition to or as an alternative to the onboard memory 820. Additionally or alternatively, the marine electronic device 899 may transmit or receive data, such as radar signal data, radar return data, radar image data, path data or the like to or from a sonar transducer assembly 862. In some embodiments, the marine electronic device 899 may also be configured to communicate with other devices or systems (such as through the external network 802 or through other communication networks, such as described herein). For example, the marine electronic device 899 may communicate with a propulsion system of the watercraft 100 (e.g., for autopilot control); a remote device (e.g., a user's mobile device, a handheld remote, etc.); or another system.

The communications interface 878 of the marine electronic device 899 may also include one or more communications modules configured to communicate with one another in any of a number of different manners including, for example, via a network. In this regard, the communications interface 878 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 807A.

The position sensor 845 may be configured to determine the current position and/or location of the marine electronic device 899 (and/or the watercraft 100). For example, the position sensor 845 may comprise a GPS, bottom contour, inertial navigation system, such as machined electromagnetic sensor (MEMS), a ring laser gyroscope, or other location detection system. Alternatively or in addition to determining the location of the marine electronic device 899 or the watercraft 100, the position sensor 845 may also be configured to determine the position and/or orientation of an object outside of the watercraft 100.

The display 840 (e.g. one or more screens) may be configured to present images and may include or otherwise be in communication with a user interface 835 configured to receive input from a user. The display 840 may be, for example, a conventional LCD (liquid crystal display), a touch screen display, mobile device, or any other suitable display known in the art upon which images may be displayed.

In some embodiments, the display 840 may present one or more sets of data (or images generated from the one or more sets of data). Such data includes chart data, radar data, sonar data, weather data, location data, position data, orientation data, sonar data, or any other type of information relevant to the watercraft. Radar data may be received from radar 856A located outside of a marine electronic device 899, radar 856B located in a marine electronic device 899, or from radar devices positioned at other locations, such as remote from the watercraft. Additional data may be received from marine devices such as a sonar transducer assembly 862, a primary motor 805 or an associated sensor, a trolling motor 808 or an associated sensor, a kicker motor 842 or an associated sensor, an autopilot 850, a rudder 857 or an associated sensor, a position sensor 845, a direction sensor 848, other sensors/devices 852, a remote device 854, onboard memory 820 (e.g., stored chart data, historical data, etc.), or other devices.

The user interface 835 may include, for example, a keyboard, keypad, function keys, buttons, a mouse, a scrolling device, input/output ports, a touch screen, or any other mechanism by which a user may interface with the system.

Although the display 840 of FIG. 8 is shown as being directly connected to the processor(s) 810 and within the marine electronic device 899, the display 840 may alternatively be remote from the processor(s) 810 and/or marine electronic device 899. Likewise, in some embodiments, the position sensor 845 and/or user interface 835 may be remote from the marine electronic device 899.

The marine electronic device 899 may include one or more other sensors/devices 852, such as configured to measure or sense various other conditions. The other sensors/devices 852 may include, for example, an air temperature sensor, a water temperature sensor, a current sensor, a light sensor, a wind sensor, a speed sensor, or the like.

A sonar transducer assembly 862 is also provided in the system 807A. The sonar transducer assembly 862 illustrated in FIG. 8 may include one or more sonar transducer elements 867, such as may be arranged to operate alone or in one or more transducer arrays. In some embodiments, additional separate sonar transducer elements (arranged to operate alone, in an array, or otherwise) may be included. As indicated herein, the sonar transducer assembly 862 may also include a sonar signal processor or other processor (although not shown) configured to perform various sonar processing. In some embodiments, the processor (e.g., processor(s) 810 in the marine electronic device 899, a controller (or processor portion) in the sonar transducer assembly 862, or a remote controller—or combinations thereof) may be configured to filter sonar return data and/or selectively control sonar transducer element(s) 867. For example, various processing devices (e.g., a multiplexer, a spectrum analyzer, A-to-D converter, etc.) may be utilized in controlling or filtering sonar return data and/or transmission of sonar signals from the sonar transducer element(s) 867. The processor(s) 810 may also be configured to filter data regarding certain objects out of map data. The sonar transducer element(s) 867 may include a conical transducer and/or a linear transducer in some embodiments, but other types of transducer elements may also be used.

The sonar transducer assembly 862 may also include one or more other systems, such as various sensor(s) 866. For example, the sonar transducer assembly 862 may include an orientation sensor, such as gyroscope or other orientation sensor (e.g., accelerometer, MEMS, etc.) that may be configured to determine the relative orientation of the sonar transducer assembly 862 and/or the one or more sonar transducer element(s) 867—such as with respect to a keel direction of the watercraft. In some embodiments, additionally or alternatively, other types of sensor(s) are contemplated, such as, for example, a water temperature sensor, a current sensor, a light sensor, a wind sensor, a speed sensor, or the like. While only one sonar transducer assembly 862 is illustrated in FIG. 8, additional sonar transducer assemblies may be provided in other embodiments. The orientation sensor associated with the sonar transducer assembly 862 may be rotationally fixed relative to the sonar transducer assembly 862 so that data obtained from the orientation sensor is representative of the actual orientation for the sonar transducer assembly 862. In some embodiments, the sonar transducer assembly 862 is configured to generate a single beam at one time, but the sonar transducer assembly 862 may be configured to generate multiple beams at one time in other embodiments.

One or more actuators 869 are also included in the system 807A, and the actuator(s) 869 may be used to generate movement in the sonar transducer assembly 862. In some embodiments, an actuator may be provided as part of the sonar transducer assembly 862 to control the positioning and/or orientation of the sonar transducer assembly 862 relative to other components, but the actuator(s) 869 are provided outside of the sonar transducer assembly 862. The actuator(s) 869 may be a linear actuator, a rotary actuator, or some other type of actuator. The actuator(s) 869 may also be powered in a variety of ways. For example, the actuator(s) 869 may be electrically powered, pneumatically powered, hydraulically powered, etc.

The components presented in FIG. 8 may be rearranged to alter the connections between components. For example, in some embodiments, a marine device outside of the marine electronic device 899, such as the radar 856A, may be directly connected to the processor(s) 810 rather than being connected to the communications interface 878. Additionally, sensors and devices implemented within the marine electronic device 899 may be directly connected to the communications interface 878 in some embodiments rather than being directly connected to the processor(s) 810.

FIG. 9 is a flow chart illustrating an example method 900 for forming a sonar image from a sonar transducer assembly. At operation 902, first sonar data is received from a sonar transducer assembly when the sonar transducer assembly is oriented in a first orientation. This first sonar data may provide data regarding a first underwater volume. At operation 904, first orientation data is received from an orientation sensor when the sonar transducer assembly is in the first orientation.

At operation 906, movement of the sonar transducer assembly from the first orientation to the second orientation is caused. This movement may be caused by sending a signal to an actuator or by otherwise causing the actuator to generate movement of the sonar transducer assembly. As the sonar transducer assembly moves, at least a portion of the sonar transducer assembly may move in a sweeping motion along an arc, and this arc may extend within a single plane. The arc may be a circular arc in some embodiments, but the arc may take other shapes in other embodiments. The plane that the arc extends in may be a vertical plane, a horizontal plane, or some other plane. In some embodiments, the sonar transducer assembly may be configured to be turned to any orientation below a horizontal plane, but the sonar transducer assembly may be configured to be oriented in different manners in other embodiments.

At operation 908, second sonar data may be received from the sonar transducer assembly when the sonar transducer assembly is oriented in the second orientation. The second sonar data may provide data regarding a second underwater volume that is at least partially different from the first underwater volume. At operation 910, second orientation data may be received from the orientation sensor when the sonar transducer assembly is in the second orientation.

At operation 912, an image format for a sonar image may be determined. The image format may be how first sonar data and the second sonar data are mapped to the sonar image. For example, first sonar data may be positioned at a first location, and the image format may be configured such that the second sonar data is positioned linearly to the right of the first sonar data. Alternatively, the image format may be configured such that the second sonar data is positioned linearly above or below the first sonar data, or the image format may be configured such that the second sonar data is positioned in other directions relative to the second sonar data.

At operation 914, the sonar image is created. This sonar image may be created using the first sonar data, the second sonar data, the first orientation data, the second orientation data, and the image format. The sonar image may include a first image portion that includes image data representative of the first sonar data, and the sonar image may also include a second image portion that includes image data representative of the second sonar data. The second image portion may be at least partially different from the first image portion. Additionally, the first image portion may be positioned relative to the second image portion in a manner that correlates to the arc of the sweeping motion from the first orientation of the sonar transducer assembly to the second orientation of the sonar transducer assembly so as to portray a real-world differential position of the first sonar data relative to the second sonar data within the sonar image. For example, the offset may be a linear offset in some embodiments (see, e.g., FIGS. 3A-3B), or the offset may extend along a curved arc (see, e.g., FIGS. 4A-4B). The sonar image may include indications of an orientation of the sonar transducer assembly at different locations in the sonar image, with the indications revealing the orientation that the sonar transducer was positioned at to obtain the corresponding data in the sonar image. The sonar image may have expanded coverage relative to another sonar image formed from a stationary sonar transducer assembly.

At operation 916, presentation of the sonar image is caused on a display. At operation 918, the presentation of an indication of the image format on a display is caused. The indication may be markings, labels, gridlines, etc. indicating an approximate orientation of a sonar transducer assembly that was used to obtain sonar data at certain locations in the sonar image. For example, at locations proximate to a label of zero degrees, the sonar data may from instances where the sonar transducer assembly is oriented at a zero degree orientation (which may correspond to a forward direction of a watercraft, a downward direction of a watercraft, etc.).

The operations illustrated in the method 900 of FIG. 9 may be performed in different orders in other embodiments. Additionally, certain operations may be added to the method 900. Operations may also be omitted from the method 900 in some embodiments.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for forming a sonar image from a sonar transducer assembly on a watercraft, the system comprising:
    the sonar transducer assembly attached to the watercraft, wherein the sonar transducer assembly is configured to be turned to any orientation below a first horizontal plane corresponding to a surface of a body of water that the watercraft is on;
    an orientation sensor configured to generate orientation data for the sonar transducer assembly;
    an actuator;
    one or more processors; and
    one or more memory devices including computer program code configured to, when executed, cause the one or more processors to:
        receive first sonar data from the sonar transducer assembly when the sonar transducer assembly is oriented in a first orientation, the first sonar data providing data regarding a first underwater volume;
        receive first orientation data from the orientation sensor when the sonar transducer assembly is in the first orientation;
        cause the actuator to generate movement of the sonar transducer assembly so that the sonar transducer assembly moves from the first orientation to a second orientation, with at least a portion of the sonar transducer assembly moving in a sweeping motion along an arc as the sonar transducer assembly moves from the first orientation to the second orientation;
        receive second sonar data from the sonar transducer assembly when the sonar transducer assembly is oriented in the second orientation, the second sonar data providing data regarding a second underwater volume, the second underwater volume being at least partially different from the first underwater volume;
        receive second orientation data from the orientation sensor when the sonar transducer assembly is in the second orientation; and
        create a sonar image using the first sonar data, the second sonar data, the first orientation data, and the second orientation data, the sonar image including a first image portion including image data representative of the first sonar data and a second image portion including image data representative of the second sonar data, the second image portion being at least partially different from the first image portion, and the first image portion being positioned relative to the second image portion in a manner that correlates to the arc of the sweeping motion from the first orientation of the sonar transducer assembly to the second orientation of the sonar transducer assembly and portrays a real-world differential position of the first sonar data relative to the second sonar data within the sonar image.

2. The system of claim 1, wherein the orientation of the sonar transducer assembly changes at a constant rate as the sonar transducer assembly moves from the first orientation to the second orientation.

3. The system of claim 1, wherein the sonar transducer assembly moves from the first orientation to the second orientation with a portion of the sonar transducer assembly moving along the arc within a vertical plane.

4. The system of claim 1, wherein the sonar transducer assembly moves from the first orientation to the second orientation with a portion of the sonar transducer assembly moving along the arc within a horizontal plane.

5. The system of claim 1, wherein the second image portion is at least partially offset from the first image portion in a vertical direction within the sonar image.

6. The system of claim 1, wherein the second image portion is at least partially offset from the first image portion in a horizontal direction within the sonar image.

7. The system of claim 1, further comprising:
    a display,
    wherein the computer program code is configured to, when executed, cause the one or more processors to:
        cause the sonar image to be presented on the display.

8. The system of claim 7, wherein the sonar image includes one or more indications that illustrate an orientation of the first sonar data and the second sonar data utilized in the sonar image with respect to the watercraft.

9. The system of claim 8, wherein the one or more indications further illustrate the orientation of the first sonar data and the second sonar data utilized in the sonar image with respect to the surface of the body of water.

10. The system of claim 9, wherein the one or more indications form a first indication illustrating the orientation of the first sonar data and the second sonar data utilized in the sonar image with respect to the watercraft and a second indication illustrating the orientation of the first sonar data and the second sonar data utilized in the sonar image with respect to the surface of the body of water.

11. The system of claim 1, wherein the sonar transducer assembly is configured to generate a single beam at one time.

12. The system of claim 1, wherein the sonar transducer assembly is configured to generate multiple beams at one time.

13. The system of claim 1, wherein the sonar image has expanded coverage relative to another sonar image formed from a stationary sonar transducer assembly.

14. The system of claim 1, wherein movement of the sonar transducer assembly occurs when motors on the watercraft are not being used to generate thrust.

15. A method for forming a sonar image from a sonar transducer assembly on a watercraft, the method comprising:
receiving first sonar data from the sonar transducer assembly when the sonar transducer assembly is oriented in a first orientation, the first sonar data providing data regarding a first underwater volume;
receiving first orientation data from an orientation sensor when the sonar transducer assembly is in the first orientation;
causing an actuator to generate movement of the sonar transducer assembly so that the sonar transducer assembly moves from the first orientation to a second orientation, with at least a portion of the sonar transducer assembly moving in a sweeping motion along an arc as the sonar transducer assembly moves from the first orientation to the second orientation;
receiving second sonar data from the sonar transducer assembly when the sonar transducer assembly is oriented in the second orientation, the second sonar data providing data regarding a second underwater volume, the second underwater volume being at least partially different from the first underwater volume;
receiving second orientation data from the orientation sensor when the sonar transducer assembly is in the second orientation; and
creating a sonar image using the first sonar data, the second sonar data, the first orientation data, and the second orientation data, the sonar image including a first image portion including image data representative of the first sonar data and a second image portion including image data representative of the second sonar data, the second image portion being at least partially different from the first image portion, and the first image portion being positioned relative to the second image portion in a manner that correlates to the arc of the sweeping motion from the first orientation of the sonar transducer assembly to the second orientation of the sonar transducer assembly and portrays a real-world differential position of the first sonar data relative to the second sonar data within the sonar image.

16. The method of claim 15, wherein the sonar transducer assembly is configured to be turned to any orientation below a first horizontal plane corresponding to a surface of a body of water that the watercraft is on.

17. The method of claim 15, wherein the sonar image includes one or more indications that illustrate an orientation of the first sonar data and the second sonar data utilized in the sonar image with respect to the watercraft.

18. The method of claim 17, wherein the one or more indications further illustrate the orientation of the first sonar data and the second sonar data utilized in the sonar image with respect to the surface of the body of water.

19. The method of claim 18, wherein the one or more indications form a first indication illustrating the orientation of the first sonar data and the second sonar data utilized in the sonar image with respect to the watercraft and a second indication illustrating the orientation of the first sonar data and the second sonar data utilized in the sonar image with respect to the surface of the body of water.

20. A non-transitory computer readable medium having stored thereon software instructions that, when executed by a processor, cause the processor to form a sonar image from a sonar transducer assembly on a watercraft by:
receiving first sonar data from the sonar transducer assembly when the sonar transducer assembly is oriented in a first orientation, the first sonar data providing data regarding a first underwater volume;
receiving first orientation data from an orientation sensor when the sonar transducer assembly is in the first orientation;
causing an actuator to generate movement of the sonar transducer assembly so that the sonar transducer assembly moves from the first orientation to a second orientation, with at least a portion of the sonar transducer assembly moving in a sweeping motion along an arc as the sonar transducer assembly moves from the first orientation to the second orientation;
receiving second sonar data from the sonar transducer assembly when the sonar transducer assembly is oriented in the second orientation, the second sonar data providing data regarding a second underwater volume, the second underwater volume being at least partially different from the first underwater volume;
receiving second orientation data from the orientation sensor when the sonar transducer assembly is in the second orientation; and
creating a sonar image using the first sonar data, the second sonar data, the first orientation data, and the second orientation data, the sonar image including a first image portion including image data representative of the first sonar data and a second image portion including image data representative of the second sonar data, the second image portion being at least partially different from the first image portion, and the first image portion being positioned relative to the second image portion in a manner that correlates to the arc of the sweeping motion from the first orientation of the sonar transducer assembly to the second orientation of the sonar transducer assembly and portrays a real-world differential position of the first sonar data relative to the second sonar data within the sonar image.

* * * * *